US010924679B2

(12) United States Patent
Lee et al.

(10) Patent No.: US 10,924,679 B2
(45) Date of Patent: Feb. 16, 2021

(54) DISPLAY DEVICE FOR VEHICLE AND CONTROL METHOD THEREOF

(71) Applicant: LG ELECTRONICS INC., Seoul (KR)

(72) Inventors: Jaeho Lee, Seoul (KR); Ilwan Kim, Seoul (KR); Sunghwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 15/206,717

(22) Filed: Jul. 11, 2016

(65) Prior Publication Data

US 2017/0187963 A1 Jun. 29, 2017

(30) Foreign Application Priority Data

Dec. 24, 2015 (KR) ........................ 10-2015-0186607

(51) Int. Cl.
*H04N 5/232* (2006.01)
*B60R 1/00* (2006.01)
*G02B 27/01* (2006.01)
*G01C 21/36* (2006.01)
(Continued)

(52) U.S. Cl.
CPC ......... *H04N 5/232945* (2018.08); *B60R 1/00* (2013.01); *G01C 21/365* (2013.01); *G02B 27/01* (2013.01); *G06F 3/013* (2013.01); *G06K 9/00791* (2013.01); *G06K 9/00845* (2013.01); *H04N 5/23218* (2018.08); *H04N 5/23293* (2013.01); *B60R 2300/205* (2013.01); *B60R 2300/301* (2013.01); *B60R 2300/802* (2013.01); *B60R 2300/804* (2013.01);
(Continued)

(58) Field of Classification Search
CPC ................ G06F 3/013; G06K 9/00791; G06K 9/00845; G01C 21/365; B60R 2300/802; B60R 2300/804; B60R 2300/8093
See application file for complete search history.

(56) References Cited

U.S. PATENT DOCUMENTS

| | | | |
|---|---|---|---|
| 7,167,779 B2 * | 1/2007 | Kashiwada | G02B 27/01 340/435 |
| 7,561,966 B2 | 7/2009 | Nakamura et al. | |
| 7,734,419 B2 | 6/2010 | Kondoh | |

(Continued)

FOREIGN PATENT DOCUMENTS

| | | |
|---|---|---|
| CN | 1629930 A | 6/2005 |
| CN | 101913357 A | 12/2010 |

(Continued)

*Primary Examiner* — Boubacar Abdou Tchoussou
(74) *Attorney, Agent, or Firm* — Birch, Stewart, Kolasch & Birch, LLP

(57) ABSTRACT

A display device for a vehicle, and including a camera configured to acquire an image around the vehicle; a display unit configured to display a graphic image on a windshield of the vehicle; and a processor configured to detect at least one object included in the acquired image viewed by a driver of the vehicle, determine information of the detected object comprising a position and size of an area of the windshield in which the object is viewed, and a type of the object, and control the display unit to display the graphic image on an area of the windshield based on the determined information of the object.

18 Claims, 35 Drawing Sheets

(51) Int. Cl.
*G06F 3/01* (2006.01)
*G06K 9/00* (2006.01)

(52) U.S. Cl.
CPC ............... *B60R 2300/8093* (2013.01); *G02B 2027/014* (2013.01); *G02B 2027/0138* (2013.01)

(56) References Cited

U.S. PATENT DOCUMENTS

| | | | |
|---|---|---|---|
| 7,751,958 B2* | 7/2010 | Yoshiguchi | B62D 15/029 340/438 |
| 8,358,224 B2 | 1/2013 | Seder et al. | |
| 8,461,976 B2 | 6/2013 | Yamamoto et al. | |
| 9,073,484 B2* | 7/2015 | Aimura | B60R 1/00 |
| 9,201,504 B2* | 12/2015 | Gohng | B60K 35/00 |
| 9,269,007 B2 | 2/2016 | Iguchi | |
| 9,280,901 B2* | 3/2016 | Chen | G08G 1/167 |
| 9,767,693 B2* | 9/2017 | Lee | G08G 1/166 |
| 9,874,746 B2* | 1/2018 | Matsubara | G02B 27/0101 |
| 10,304,228 B2* | 5/2019 | Shishido | B60K 35/00 |
| 10,378,916 B2 | 8/2019 | Funabiki et al. | |
| 2004/0178894 A1 | 9/2004 | Janssen | |
| 2004/0193331 A1* | 9/2004 | Kashiwada | G02B 27/01 701/1 |
| 2005/0071082 A1* | 3/2005 | Ohmura | G01C 21/365 701/431 |
| 2005/0134479 A1 | 6/2005 | Isaji et al. | |
| 2005/0154505 A1* | 7/2005 | Nakamura | G01C 21/365 701/1 |
| 2007/0104352 A1* | 5/2007 | Yoshiguchi | B60W 50/14 382/104 |
| 2007/0106471 A1* | 5/2007 | Yoshiguchi | B62D 15/029 701/431 |
| 2007/0106475 A1 | 5/2007 | Kondoh | |
| 2008/0195315 A1 | 8/2008 | Hu et al. | |
| 2009/0189753 A1* | 7/2009 | Enya | G02B 27/01 340/435 |
| 2010/0253542 A1* | 10/2010 | Seder | G01S 7/22 340/932.2 |
| 2012/0249589 A1* | 10/2012 | Gassner | G02B 27/01 345/633 |
| 2012/0320212 A1* | 12/2012 | Aimura | B60R 1/00 348/148 |
| 2012/0326967 A1* | 12/2012 | Gohng | B60K 35/00 345/156 |
| 2014/0019005 A1* | 1/2014 | Lee | G08G 1/166 701/36 |
| 2014/0063064 A1* | 3/2014 | Seo | G08G 1/166 345/633 |
| 2014/0097968 A1* | 4/2014 | Kamiya | B60Q 1/0023 340/905 |
| 2014/0368540 A1 | 12/2014 | Iguchi | |
| 2015/0331236 A1* | 11/2015 | Roth | B60K 37/00 348/48 |
| 2015/0331238 A1* | 11/2015 | Roth | B60K 37/00 348/115 |
| 2016/0004076 A1* | 1/2016 | Matsubara | G02B 27/0101 345/7 |
| 2016/0159280 A1 | 6/2016 | Takazawa et al. | |
| 2016/0170487 A1* | 6/2016 | Saisho | G01C 21/3635 345/156 |
| 2016/0203629 A1* | 7/2016 | Takeda | G01C 21/3626 345/632 |
| 2016/0216521 A1* | 7/2016 | Yachida | G01C 21/365 |
| 2016/0257199 A1* | 9/2016 | Bark | B60K 35/00 |
| 2016/0327402 A1* | 11/2016 | Funabiki | G01C 21/365 |
| 2017/0084176 A1 | 3/2017 | Nakamura | |
| 2017/0161009 A1* | 6/2017 | Ogisu | B60K 35/00 |
| 2017/0351092 A1* | 12/2017 | Nakata | B60K 35/00 |
| 2018/0286094 A1* | 10/2018 | Shishido | B60K 35/00 |

FOREIGN PATENT DOCUMENTS

| | | |
|---|---|---|
| EP | 2 955 690 A1 | 12/2015 |
| JP | 2005-69799 A | 3/2005 |
| JP | 2005-182306 A | 7/2005 |
| JP | 2006-284458 A | 10/2006 |
| JP | 2011-118482 A | 6/2011 |
| JP | 2013-203374 A | 10/2013 |
| JP | 2014-181927 A | 9/2014 |
| JP | 2015-629 A | 1/2015 |
| JP | 2015-101311 A | 6/2015 |
| KR | 10-2015-0056323 A | 5/2015 |
| WO | WO 03/0005102 A1 | 1/2003 |
| WO | WO 2014/002167 A1 | 1/2014 |
| WO | WO 2014/095071 A1 | 6/2014 |
| WO | WO 20151001796 A1 | 1/2015 |
| WO | WO 2015/060193 A1 | 4/2015 |
| WO | WO 2015/079654 A1 | 6/2015 |
| WO | WO 2015/118859 A | 8/2015 |
| WO | WO 2015/146619 A1 | 10/2015 |

* cited by examiner

DISPLAY DEVICE FOR VEHICLE AND CONTROL METHOD THEREOF

CROSS-REFERENCE TO RELATED APPLICATIONS

The present application claims priority under 35 U.S.C. § 119 and 35 U.S.C. § 365 to Korean Patent Application No. 10-2015-0186607 filed on 24 Dec. 2015, which is hereby incorporated by reference in its entirety.

TECHNICAL FIELD

The present disclosure relates to a display device for a vehicle, and a vehicle including the display device.

BACKGROUND

A vehicle is an apparatus that moves a user in a direction in which he or she wants to go. A representative example of the vehicle can be a car. Cars are classified into an internal combustion engine car, an external combustion engine car, a gas turbine car, and an electric vehicle according to a used motor.

The electric vehicle refers to a car that operates an electric motor by using electricity as energy, and includes a pure electric vehicle, a hybrid electric vehicle (HEV), a plug-in hybrid electric vehicle (PHEV), a fuel cell electric vehicle (FCEV) or the like. In recent, a smart vehicle is being actively developed for the safety or convenience of a driver, a pedestrian or the like.

Especially, in order to deliver necessary information while a driver gazes at the front, a head up display that displays a graphic image on the windshield of the vehicle is receiving attention. Since such a head up display displays a graphic imaged on the windshield of the vehicle, there is an advantage of preventing the gaze of a driver from becoming distracted.

However, since there is a technical limitation in that most graphic images currently displayed on the head up display show only preset information at a fixed position, there is a drawback in that it is difficult to actively deliver information suitable for a situation according to a situation around the vehicle. A technology that combines an object around a vehicle with a graphic image to implement augmented reality is being recently developed, but there is a limitation in that the graphic image obstructs the view of a driver.

SUMMARY

Embodiments provide a display device for a vehicle that displays a graphic image on the windshield of the vehicle by using an optimal display method according to a driving situation, and a vehicle including the display device.

To achieve these and other advantages and in accordance with the purpose of the present invention, as embodied and broadly described herein, the present invention provides in one aspect a display device for a vehicle, and including a camera configured to acquire an image around the vehicle; a display unit configured to display a graphic image on a windshield of the vehicle; and a processor configured to detect at least one object included in the acquired image viewed by a driver of the vehicle, determine information of the detected object comprising a position and size of an area of the windshield in which the object is viewed, and a type of the object, and control the display unit to display the graphic image on an area of the windshield based on the determined information of the object. In another aspect, the present invention provides a method of controlling a corresponding display device.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
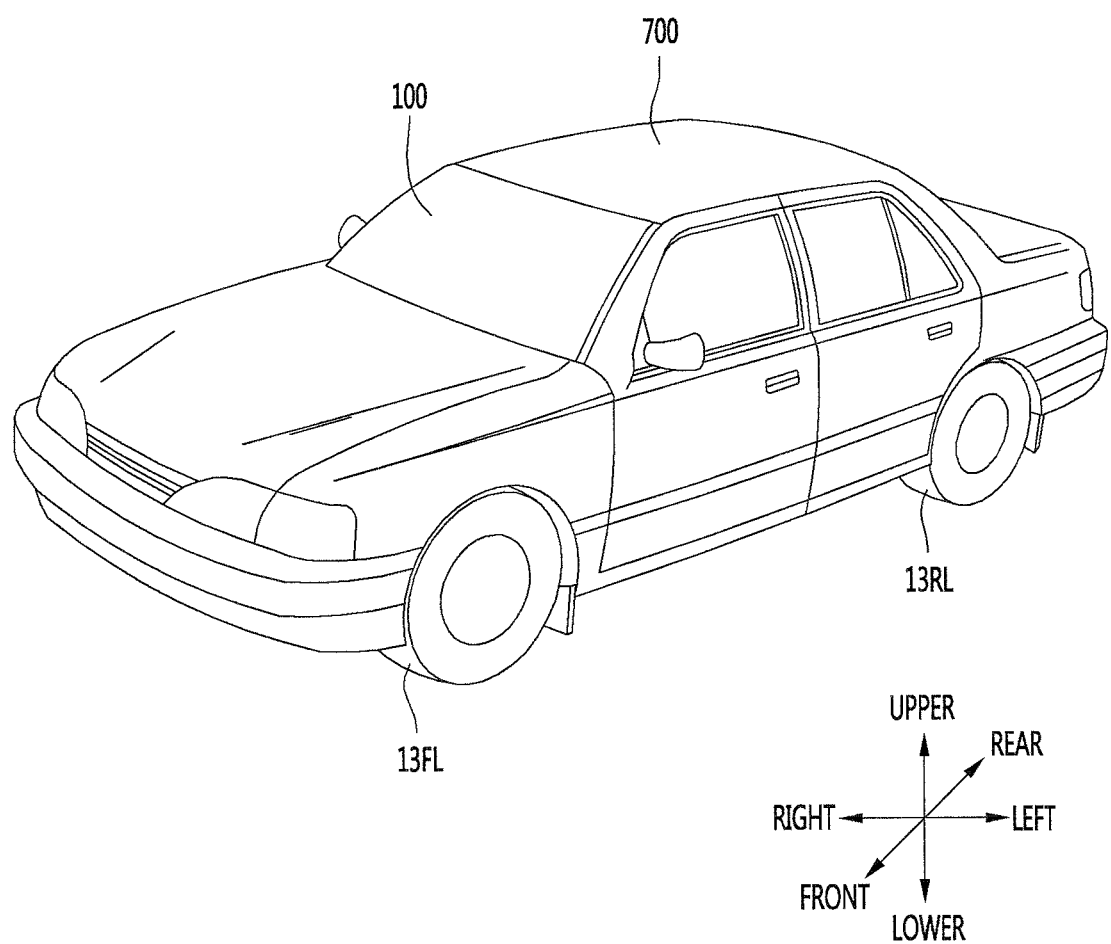
FIG. 1 represents the exterior of a display device for a vehicle according to an embodiment.

Hereinafter, embodiments are described in detail with reference to the accompanying drawings and regardless of the numbers of the drawings, same or similar components are assigned with the same reference numerals and thus repetitive descriptions for those are omitted. Since the suffixes "module" and "unit" for components used in the following description are given and interchanged for easiness in making the present disclosure, they do not have distinct meanings or functions. Also, the accompanying drawings are used to help easily understanding embodiments disclosed herein but the technical idea disclosed in the present disclosure is not limited thereto. It should be understood that all of variations, equivalents or substitutes contained in the concept and technical scope of the inventive concept are also included.

Although the terms 'first' and 'second' may be used to describe various components, these components should not be limited to these terms. The terms are used only in order to distinguish a component from another component. When it is mentioned that any component is "connected" or "accessed" to another component, it should be understood that the former can be directly connected to the latter, or there may be another component in between. On the contrary, when any component is referred to as being 'directly connected' or 'directly accessed' to another component, it should be understood that there may be no other component in between.

The terms in singular form include the plural form unless otherwise specified. It should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

A vehicle discussed in the present disclosure may include a car or motorcycle. In the following, the car of the vehicle is mostly discussed. The vehicle discussed in the present disclosure may include all of an internal combustion engine vehicle that includes an engine as a power source, a hybrid vehicle that includes an engine and an electrical motor as a power source, and an electrical vehicle that includes an electrical motor as a power source.

In the following description, the right side of the vehicle means the left side of the driving direction of the vehicle and the right side of the vehicle means the right side of the driving direction of the vehicle. In the following description, a left hand drive (LHD) vehicle is mostly described unless mentioned to the contrary In addition, in the following description, a display device for a vehicle is a separate device that is disposed in the vehicle, and transmits and receives necessary information through data communication with the vehicle to perform a driver assistance function. However, it is also possible to define some of the units of the vehicle as the display device for the vehicle.

When the display device for the vehicle is the separate device, at least some of the units (See FIG. 2) of the display device for the vehicle can not be included in the display device for the vehicle but may be the units of the vehicle or of another device loaded in the vehicle. In addition, by transmitting and receiving data through an interface unit of the display device for the vehicle, these external units may be understood to be included in the display device for the vehicle.

Figure 2:
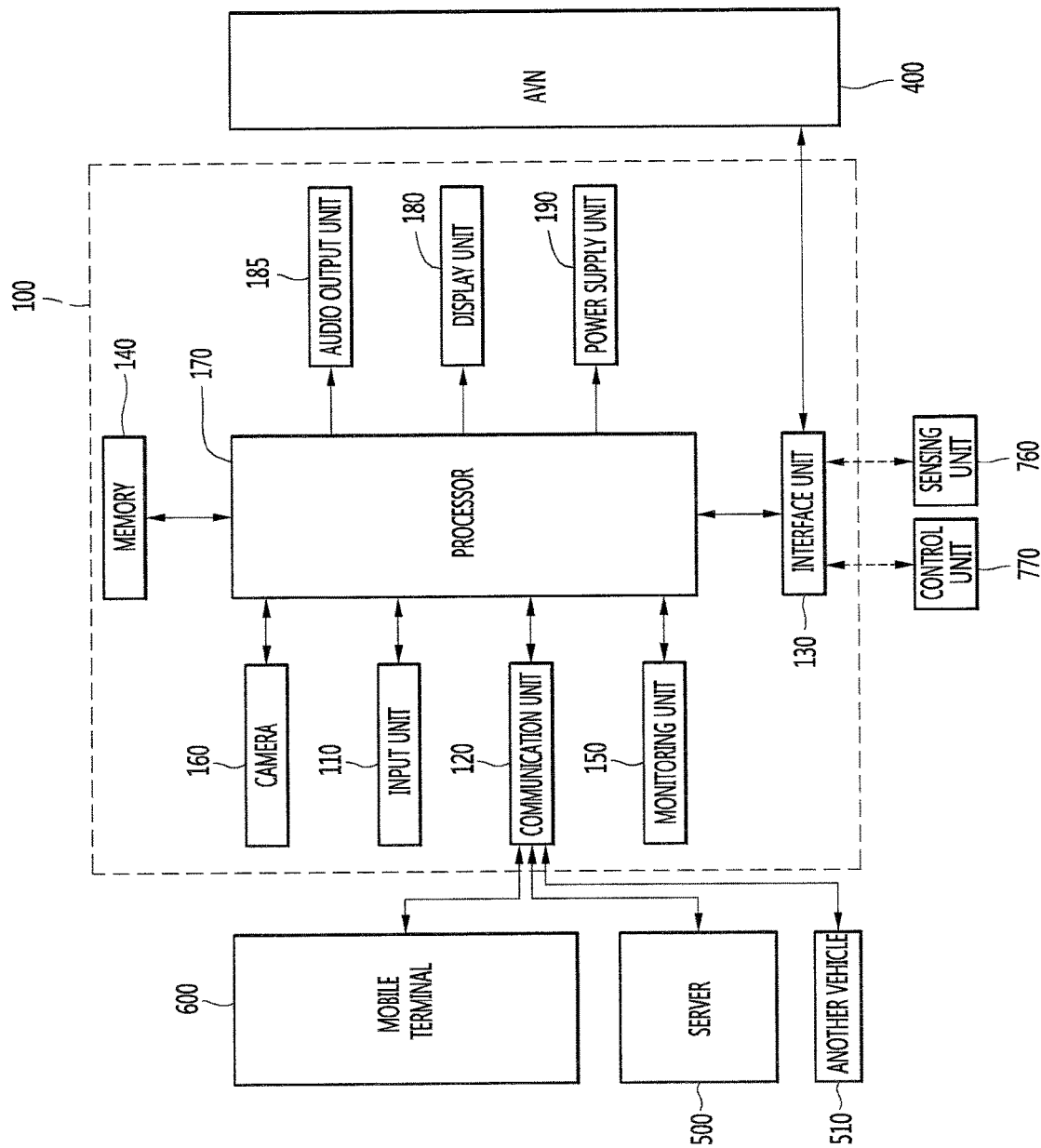
FIG. 2 represents a block diagram of a display device for a vehicle according to an embodiment.

For the convenience of description, it is described below that the display device for the vehicle directly includes the units shown in FIG. 2. In the following, the display device for the vehicle according to an embodiment is described in detail with reference to the accompanying drawings.

Referring to FIG. 1, a vehicle 700 according to an embodiment includes wheels 13FL and 13RL that rotate by a power source, and a display device 100 for a vehicle. The display device 100 for the vehicle can detect a situation around the vehicle, detect an object that a driver must observe from the situation around the vehicle, and then display a graphic image on the windshield according to the position of the object and the view of the driver. That is, the display device 100 for the vehicle can detect an object around the vehicle, determine a method of displaying a graphic image on the windshield according to information on the object around the vehicle, and provide, to the driver, a graphic image suitable for a situation around the vehicle.

Here, the graphic image display method may include at least one of the position of the graphic image on the windshield, the transparency, saturation, color and size of the graphic image, and the amount of information displayed by the graphic image. For example, the display device 100 for the vehicle can set a display area so that the object shown through the windshield does not overlap the graphic image, and display the graphic image suitably for the size of the display area to effectively deliver necessary information without obstructing the view of a driver.

In the following, the display device 100 for the vehicle according to the embodiment is described in detail with reference to FIGS. 2 to 8. Referring to FIG. 2, the display device 100 for the vehicle can include an input unit 110, a communication unit 120, an interface unit 130, a memory 140, a monitoring unit 150, a sensor unit 190, a processor 170, a display unit 180, an audio output unit 185, and a power supply unit 190. However, the display device 100 for the vehicle to be described in the present disclosure may have more or less components than those enumerated above.

The display device 100 for the vehicle can include the input unit 110 that detects a user's input. For example, a user can set a function of showing a graphic image on the windshield of the display device 100 for the vehicle or turn on/off the power supply of the display device 100 for the vehicle, through the input unit 110.

Such an input unit 110 includes at least one of a gesture input unit (e.g., an optical sensor) that detects a user gesture, a touch input unit (e.g., a touch sensor, a touch key, or a mechanical key) that detects a touch, and a microphone that detects a voice input, and may detect a user input. Next, the display device 100 for the vehicle can include a communication unit 120 that communicates with another vehicle 520, a terminal 600, a server 510, etc.

The display device 100 for the vehicle can receive, through the communication unit 120, communication information that includes at least one of pieces of navigation information, another vehicle's driving information, and traffic information. In addition, necessary information among these may be displayed on the display device 100 for the vehicle according to a situation. Also, the communication unit 120 can further receive at least one of pieces of position information, weather information, and road traffic information (e.g., transport protocol expert group (TPEG) information) from the mobile terminal 600 and/or the server 510.

The communication unit 120 can receive traffic information from the server 510 that includes an intelligent transport system (ITS). Here, the traffic information may include traffic light information, lane information or the like. The communication unit 120 can also receive navigation information from the server 510 and/or the mobile terminal 600. Here, the navigation information may include at least one of pieces of map information relating to vehicle driving, lane information, position information on the vehicle, preset destination information, and route information depending on a destination.

The communication unit 120 can receive the real-time position of the vehicle 700 by navigation information. For example, the communication unit 120 may include a global positioning system (GPS) module or a wireless fidelity (WiFi) module to acquire the position of the vehicle.

The communication unit 120 can receive, from the other vehicle 520, driving information on the other vehicle 520 and transmit driving information on the vehicle 700 to share driving information with vehicles. Here, driving information that is shared may include at least one of pieces of direction information, position information, vehicle speed information, acceleration information, travel route information, forward/backward movement information, adjacent vehicle information, and turn signal information.

Also, when a user gets in the vehicle 700, the mobile terminal 600 of the user and the display device 100 for the vehicle can also perform pairing automatically or by the execution of an application by the user. The communication unit 120 can exchange data with the other vehicle 520, the mobile terminal 600 or the server 510 wirelessly.

Specifically, the communication unit 120 can perform wireless communication by using wireless data communication. The wireless data communication may use technical standards or communication techniques for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A)).

The communication unit 120 can use a wireless internet technology, which may include e.g., wireless LAN (WLAN), Wi-Fi, Wi-Fi Direct, digital living network alliance (DLNA), wireless broadband (WiBro), world interoperability for microwave access (WiMAX), HSDPA, HSUPA, LTE, LTE-A, etc. The communication unit 120 may use short-range communication and may support short-range communication by using at least one of e.g., Bluetooth™, radio frequency identification (RFID), infrared data association (IrDA), ultra wideband (UWB), ZigBee, near field communication (NFC), Wi-Fi, Wi-Fi Direct, and wireless universal serial bus (wireless USB) technologies.

The display device 100 for the vehicle can use the short range communication to perform pairing with a mobile terminal in the vehicle, and use a wireless communication module in the mobile terminal to exchange data with the other vehicle 520 and the server 510 wirelessly.

Next, the display device 100 for the vehicle can include the interface unit 130 that receives vehicle related data or transmits a signal processed or generated by the processor 170 to the outside. Specifically, the display device 100 for the vehicle can receive at least one of pieces of navigation information and sensor information through the interface unit 130. In addition, necessary information among these may be displayed on the display device 100 for the vehicle according to a situation.

The display device 100 for the vehicle can transmit, through the interface unit 130, a control signal for executing the function of displaying a graphic image on the windshield or information generated by the display device 100 for the vehicle. Thus, the interface unit 130 can perform data communication with at least one of a control unit 770, an audio video navigation (AVN) device 400 and a sensing unit 760 inside the vehicle through wired or wireless communication.

Specifically, the interface unit 130 can receive navigation information through data communication with the control unit 770, the AVN device 400 and/or a separate navigation device. The interface unit 130 can receive sensor information from the control unit 770 or the sensing unit 760.

Here, the sensor information may include at least one of pieces of vehicle 700 direction information, position information, vehicle speed information, acceleration information, tilt information, forward/backward movement information, fuel information, information on the distance to the front and rear vehicles, information on the distance between a vehicle and a lane, and turn signal information.

The sensor information may be acquired from a heading sensor, a yaw sensor, a gyro sensor, a position module, a vehicle's forward/backward movement sensor, a wheel sensor, a vehicle speed sensor, a vehicle-body tilt sensor, a battery sensor, a fuel sensor, a tire sensor, a steering sensor by the rotation of a steering wheel, a vehicle's internal temperature sensor, a vehicle's internal humidity sensor, a door sensor, etc. The position module may include a GPS module for GPS information reception.

In addition, the interface unit 130 can receive a user input received through the user input unit 110 of the vehicle 700 or through the control unit 770. That is, when the input unit is disposed as a component inside the vehicle, it is possible to receive the user input through the interface unit 130.

The interface unit 130 can also receive traffic information acquired from the server 510. That is, the server 510 may be a server that is located at a traffic control center that controls traffic. For example, when the traffic information is received from the server 510 through the communication unit 120 of the vehicle 700, the interface unit 130 can also receive the traffic information from the control unit 770.

Next, the memory 140 can store various pieces of data for the overall operations of the display device 100 for the vehicle, such as programs for processing or controlling by the processor 170. Specifically, the memory 140 can store many application programs or applications executed on the display device 100 for the vehicle or data and commands for the operation of the display device 100 for the vehicle. At least some of the application programs may be downloaded from an external server through wireless communication.

Also, at least some of the application programs may exist in the display device 100 for the vehicle for the fundamental functions (e.g., a function of displaying a graphic image on the windshield) of the display device 100 for the vehicle when the vehicle comes out of the factory. In addition, the application programs may be stored in the memory 140 and enable the operation (or function) of the display device 100 for the vehicle to be executed by the processor 170.

The memory 140 can also store data for verifying an object in an image. For example, the memory 140 may store data for checking through a certain algorithm what an object is when a certain object is detected from an image around the vehicle that is acquired through the camera 160. In another example, the memory 140 can store data for checking through a certain algorithm what an object is when the image acquired through the camera 160 includes a certain object, such as a lane, a traffic sign board, a two-wheeled vehicle, or a pedestrian.

The memory 140 may include, as hardware, at least one of various types of storage mediums, including a flash memory type memory, a hard disk type memory, a solid state disk (SSD) type memory, a silicon disk drive (SDD) type memory, a multimedia card micro type memory, a card type memory (e.g., an SD or XD memory), a random access memory (RAM), an static random access memory (SRAM), a read-only memory (ROM), an electrically erasable programmable read-only memory (EEPROM), a programmable read-only memory (PROM), a magnetic memory, a magnetic disk, and an optical disk. The display device 100 for the vehicle can also operate in conjunction with a web storage that performs the storage function of the memory 140 on the internet.

Next, the monitoring unit 150 can acquire user's biometric information. Especially, the monitoring unit 150 can detect the gaze of a driver and acquire it as monitoring information. In addition, the obtained information on the gaze of the driver may be used when displaying a graphic image. For example, the display device 100 for the vehicle can determine a view area observed by the driver through the windshield according to the gaze of the driver and acquire an image from a camera corresponding to the view area. Then, the display device 100 for the vehicle can set a display area in the acquired image, and display a graphic image in the display area to display the graphic image on the windshield so that the windshield image matches the view of the driver.

Specifically, the monitoring unit 150 can acquire an image of a user for biometrics. That is, the monitoring unit 150 can include an image acquisition module that is disposed inside the vehicle. For example, referring to FIG. 3, the monitoring unit 150 may include a monitoring camera capturing an image of the interior of a vehicle to capture an image of a driver inside the vehicle and detect the eyesight direction of the driver to acquire facial recognition as monitoring information.

The biometric information that the monitoring unit 150 detects may further include at least one of pieces of image information including an image of a user, fingerprint information, iris-scan information, retina-scan information, hand geometry information, and voice recognition information.

The display device 100 for the vehicle can further include a sensor unit that detects an object around the vehicle 700. The display device 100 for the vehicle can also include a separate sensor unit to detect an object around the vehicle, and also receive the sensor information obtained by the sensing unit 770 of the vehicle 700 itself, through the interface unit 130. Especially, the sensor unit may include a distance sensor that detects the position of an object, and a camera 160 that captures an image around the vehicle to acquire an image.

The distance sensor can also precisely detect the direction and distance of the object from the present vehicle 700, and a direction in which the object moves. The distance sensor may continuously measure a positional relationship with the detected object to accurately detect a variation in positional relationship. The distance sensor may include various distance measurement sensors, such as a lidar sensor, a laser sensor, an ultrasonic sensor, a stereo camera, or the like.

For example, the distance sensor may be a laser sensor and measure the positional relationship between the vehicle 700 and the object by using time-of-flight (TOF) and/or phase shift according to a laser signal modulation method. Specifically, the TOF can measure the distance and direction to the object by emitting a pulse laser signal and measuring a time when reflected pulse signals from the objects within a measurement range reach a receiver.

The display device 100 for the vehicle can include the camera 160 that captures images around the vehicle. In addition, the obtained image around the vehicle can enable the processor 170 to detect an object around the vehicle and the attribute of the object to generate image information.

Here, the image information is at least one of pieces of information, such as a type of object, signal information that the object shows, the distance between the object and the vehicle, and the position of the object, and may be included in sensor information. Specifically, the processor 170 can perform object analysis, such as detecting an image from the captured image through image processing, tracking the object, measuring the distance to the object or the like to generate image information.

Such a camera 160 may be disposed at various positions. Specifically, referring to FIG. 4, the camera 160 may include an internal camera 160f that captures an image in front of the vehicle 700 inside the vehicle to acquire a front image. Also, a plurality of cameras 160 may be disposed at at least one of the left, rear, right, front, and ceiling of the vehicle 700, respectively.

A left camera 160b may be disposed in a casing that surrounds a left side mirror. Alternatively, the left camera 160b may be disposed outside the casing that surrounds the left side mirror. The left camera 160b may also be disposed in an area outside a left front door, a left rear door or left fender.

Further, the right camera 160c may be disposed in a casing that surrounds a right side mirror. Alternatively, the right camera 160c may be disposed outside the casing that surrounds the right side mirror. The right camera 160c may also be disposed in an area outside a right front door, a right rear door or right fender.

Also, a rear camera 160d may be disposed near a rear number plate or trunk switch, and a front camera 160a may be disposed near an emblem or radiator grill. The processor 170 can also synthesize images captured in all directions to provide an around view image from a top view of the vehicle 700. When the around view image is generated, boundaries are generated among image areas. These boundaries may be naturally displayed by image blending.

Also, a ceiling camera 160e may be disposed on the ceiling of the vehicle 700 to capture images of the front, rear, left and right of the vehicle 700. Such a camera 160 may also include an image sensor and an image processing module. The camera 160 can process a still image or video that is obtained by the image sensor (e.g., CMOS or CCD). The image processing module may process the still image or video obtained by the image sensor to extract necessary image information, and deliver the extracted image information to the processor 170.

In order for the processor 170 to more easily perform object analysis, the camera 160 may be a stereo camera that measures the distance to the object simultaneously with capturing an image. That is, in an embodiment, the sensor unit can achieve the distance sensor and the camera 160 through the stereo camera. That is, the stereo camera can obtain an image and detect the positional relationship with an object, simultaneously.

Figure 5:
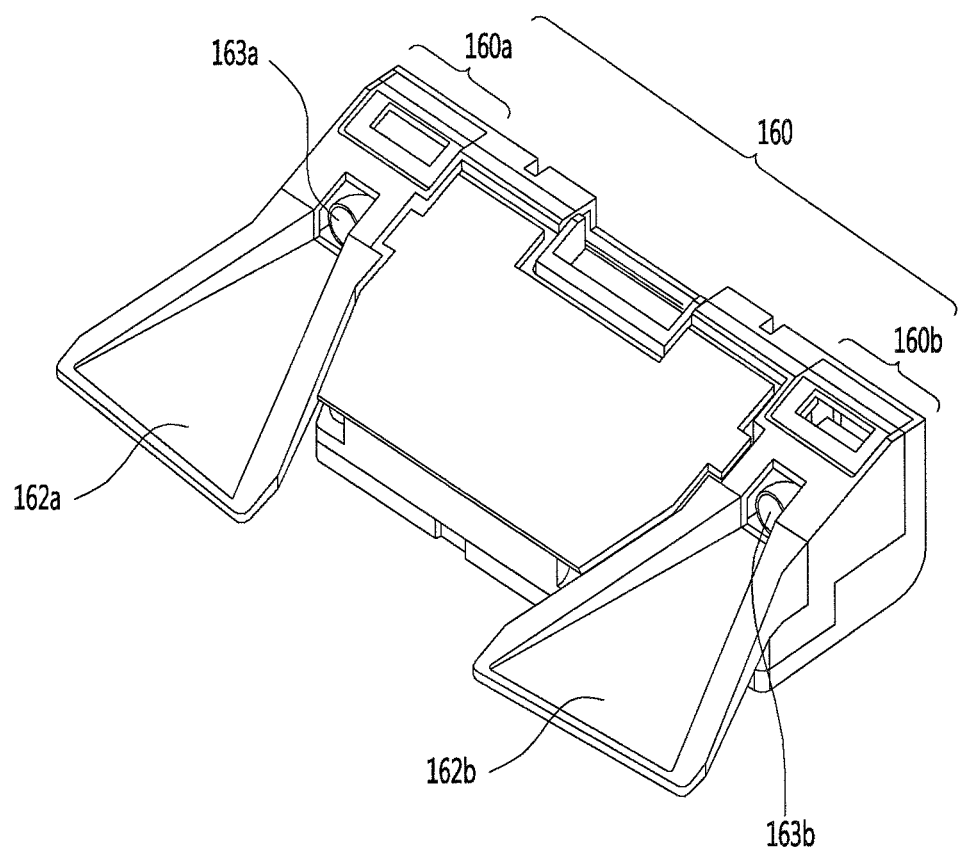
FIG. 5 represents an example of a camera according to an embodiment.

In the following, a method of detecting, by the processor 170, image information by using the stereo camera is described in more detail with reference to FIGS. 5 to 7. Referring first to FIG. 5, the stereo camera 160 may include a first camera 160a including a first lens 163a, and a second camera 160b including a second lens 163b. The display device for the vehicle can further include a first light shield 162a and a second light shield 162b for preventing light from entering the first lens 163a and the second lens 163b, respectively. The display device for the vehicle can acquire a stereo image around the vehicle from the first and second cameras 160a and 160b, perform disparity detection based on the stereo image, perform object detection on at least one stereo image based on the disparity information, and after the object detection, continue to track the motion of an object.

Figure 6:
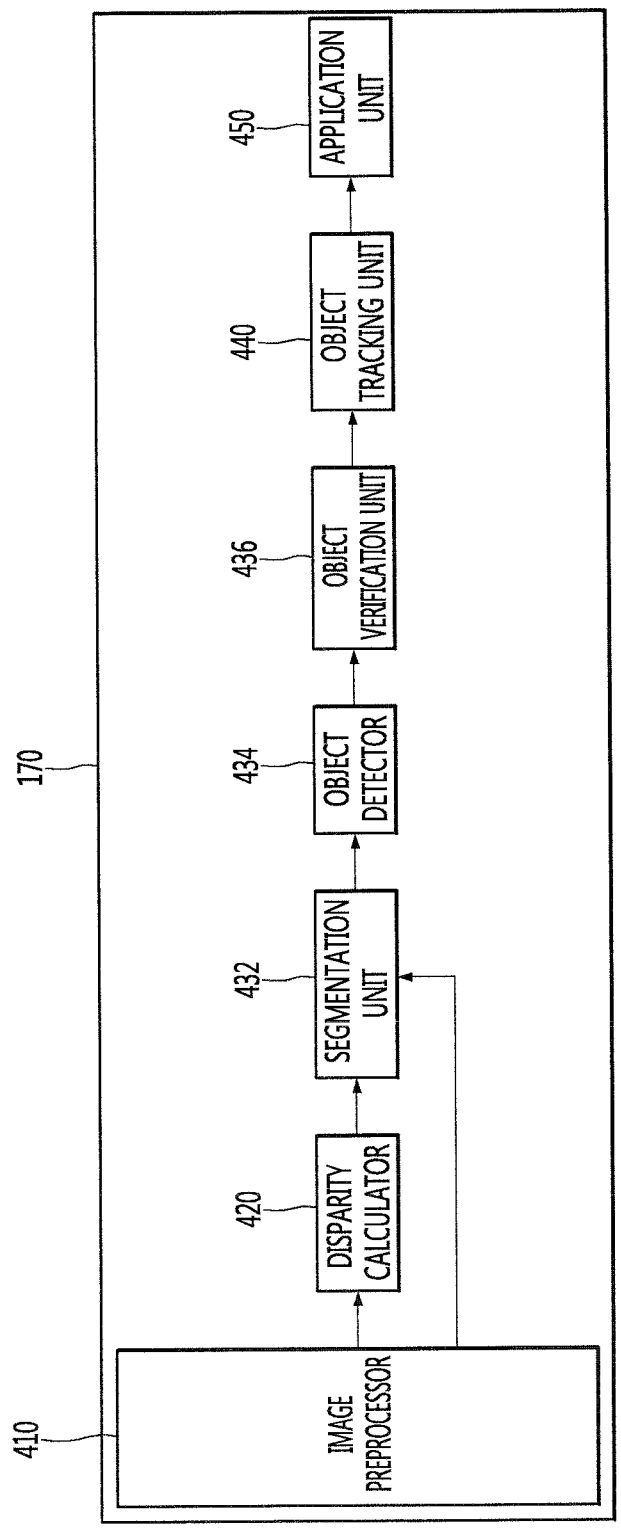
FIGS. 6 and 7 are diagrams illustrating an example of a method of generating image information from an image from a camera according to an embodiment.

Next, FIG. 6 is an example of the internal block diagram of the processor 170 and the processor 170 in the display device for the vehicle can include an image preprocessor 410, a disparity calculator 420, an object detector 434, an object tracking unit 440, and an application unit 450. Although in FIG. 5 and the following description, it is described that an image is processed in the order of the image preprocessor 410, the disparity calculator 420, the object detector 434, the object tracking unit 440, and the application unit 450, an embodiment is not limited thereto.

The image preprocessor 410 can receive an image from the camera 160 to perform preprocessing. In particular, the image preprocessor 410 can perform, on the image, noise reduction, rectification, calibration, color enhancement, color space conversion (CSC), interpolation, camera 160 gain control, or the like. Thus, it is possible to acquire an image clearer than a stereo image captured by the camera 160.

The disparity calculator 420 can receive an image signal-processed by the image preprocessor 410, perform stereo matching on the received image, and acquire a disparity map according to stereo matching. That is, it is possible to acquire disparity information on a stereo image in front of a vehicle.

In this instance, the stereo matching may be performed on a pixel or predetermined block basis of the stereo images. The disparity map may mean a map that represents, by a numerical value, binocular parallax information on the stereo images, i.e., left and right images.

A segmentation unit 432 can perform segment and clustering on at least one of images based on disparity information from the disparity calculator 420. In particular, the segmentation unit 432 can separate the background from the foreground for at least one of stereo images based on the disparity information. For example, it is possible to calculate, an area of the disparity map in which the disparity information is less than or equal to a predetermined value, as the background and exclude a corresponding part.

Thus, the foreground may be relatively separated. As another example, it is possible to calculate, an area of the disparity map in which the disparity information is equal to or greater than a predetermined value, as the foreground and extract a corresponding part. Thus, the foreground may be separated. As such, by separating the foreground from the background based on the disparity information extracted based on the stereo image, it is possible to reduce a signal processing speed, a signal processing amount, or the like when an object is detected later.

Next, the object detector 434 can detect an object based on an image segment from the segmentation unit 432. That is, the object detector 434 can detect an object from at least one of images, based on the disparity information. In particular, the object detector 434 may detect an object from at least one of images. For example, it is possible to detect an object from the foreground separated by the image segment.

Next, the object verification unit 436 can classify and verify the separated object. Thus, the object verification unit 436 can use an identification method using a neural network, a support vector machine (SVM) method, an identification method by AdaBoost using Haar-like features, a histograms of oriented gradients (HOG) method, or the like.

The object verification unit 436 can also compare objects stored in the memory 140 with detected objects to verify an object. For example, the object verification unit 436 can verify a surrounding vehicle, lane, road surface, signpost, dangerous area, tunnel or the like around a vehicle.

In addition, the object tracking unit 440 can perform tracking on the verified object. For example, it is possible to verify objects in acquired stereo images, calculate the motion or motion vector of the verified objects, and track the movement of a corresponding object based on the calculated motion or motion vector, sequentially. Thus, it is possible to track the surrounding vehicle, lane, road surface, signpost, dangerous area, tunnel or the like around the vehicle.

Next, the application unit 450 can calculate the degree of risk of the vehicle based on various objects around the vehicle, such as another vehicle, lane, road surface, signpost or the like. Also, it is possible to calculate collision possibility with the front car, whether the vehicle slips, or the like.

In addition, based on the calculated degree of risk, collision possibility or slipping possibility, the application unit 450 can output, as driver assistance information, a message for notifying a user of such information. Alternatively, it is also possible to generate, a control signal for posture control or driving control, as vehicle control information.

The image preprocessor 410, the disparity calculator 420, the segmentation unit 432, the object detector 434, the object verification unit 436, the object tracking unit 440 and the application unit 450 may be the internal components of the image processor in the processor 170. According to an embodiment, the processor 170 can include only some of the image preprocessor 410, the disparity calculator 420, the segmentation unit 432, the object detector 434, the object verification unit 436, the object tracking unit 440 and the application unit 450. If the camera 160 includes a mono camera 160 or around view camera 160, the disparity calculator 420 may be excluded. According to an embodiment, the segmentation unit 432 may also be excluded.

Figure 7:
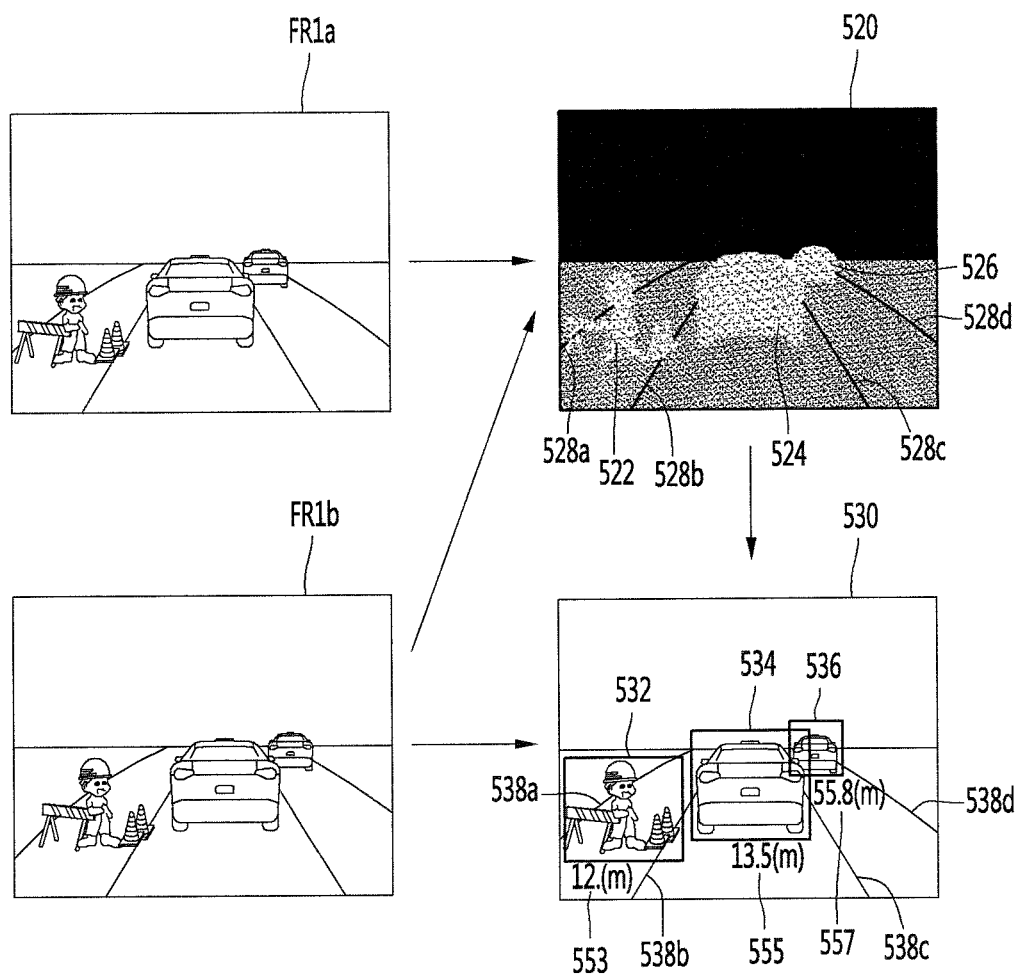
Figure 8:
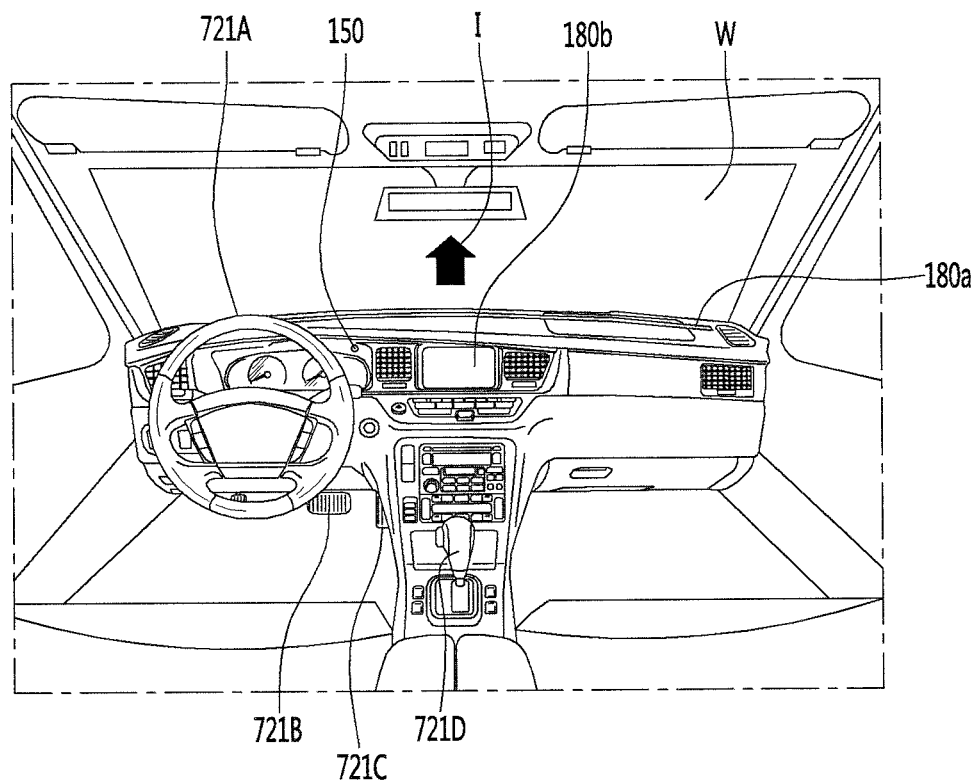
FIG. 8 is a diagram showing the interior of a vehicle that includes a display device for a vehicle according to an embodiment.
Figure 9:
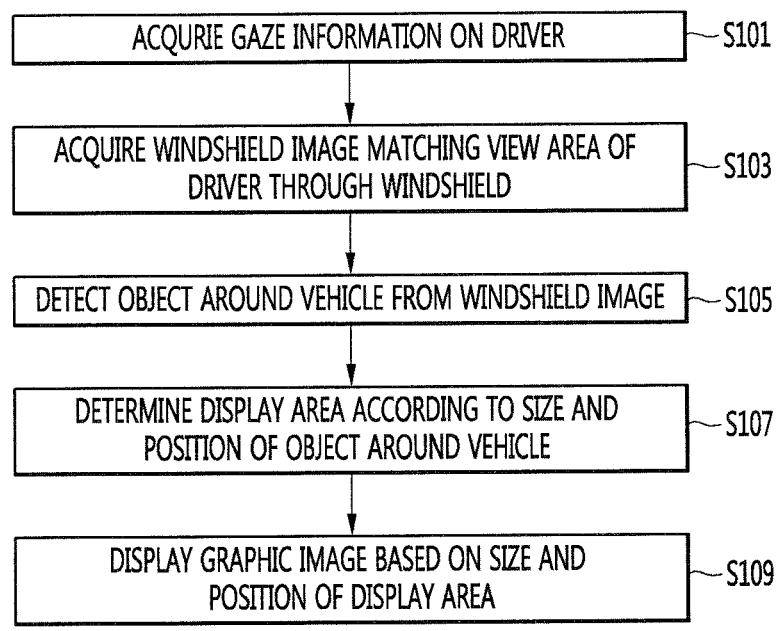
FIG. 9 is a flowchart of the process of displaying, by a display device for a vehicle according to an embodiment, a graphic image according to a situation around the vehicle.

Referring to FIG. 7, the camera 160 can acquire a stereo image for a first frame section. The disparity calculator 420 in the processor 170 can receive stereo images FR1a and FR1b signal-processed by the image preprocessor 410, and perform stereo matching on the received stereo images FR1a and FR1b to acquire a disparity map 520.

The disparity map 520 represents parallax between the stereo images FR1a and FR1b according to level, and it is possible to calculate that the higher a disparity level is, the shorter a distance to a vehicle is, and the lower the disparity level is, the longer the distance to the vehicle is. When there is a need to display such a disparity map, the disparity map may also be displayed to have high luminance the higher the disparity level is and to have low luminance the lower the disparity level is.

FIG. 7 illustrates that in the disparity map 520, first to fourth lanes 528a to 528d respectively have corresponding disparity levels, and a construction area 522, a first front vehicle 524, and a second front vehicle 526 respectively have corresponding disparity levels. The segmentation unit 432, the object detector 434, and the object verification unit 436 perform segment, object detection, and object verification on at least one of the stereo images FR1a and FR1b based on the disparity map 520.

FIG. 7 also illustrates how to detect and verify an object on the second stereo image FR1b by using the disparity map 520. That is, in an image 530, object detection and verification can be performed on first to fourth lanes 538a to 538d, a construction area 532, a first front vehicle 534, and a second front vehicle 536.

Through such image processing, the display device 100 for the vehicle can acquire object information, such as the position, size, type, and moving direction of an object around the vehicle. Specifically, the display device 100 for the vehicle can perform image processing on an image corresponding to a situation in which a driver sees through the windshield, and acquire object information in the image to determine a method of displaying a graphic image from a driver's point of view. That is, the display device 100 for the vehicle can display, on the windshield, a graphic image through object information by the above processes to combine an object with the graphic image to provide augmented reality to a driver.

Next, the display device 100 for the vehicle can further include a display unit 180 that displays a graphic image for assisting in vehicle driving. Such a display unit 180 may include a plurality of displays. Specifically, referring to FIG. 8, the display unit may include a first display unit 180a that projects and displays a graphic image I onto the windshield of the vehicle.

That is, the first display unit 180a may be a head up display (HUD) and include a projection module projecting the graphic image I onto the windshield W. In addition, the graphic image I projected by the projection module may have predetermined transparency. Thus, a user can also see the graphic image I and a view behind the graphic image I, simultaneously.

In addition, the graphic image I may also implement augmented reality (AR) along with the object projected onto the windshield W. The display unit may include a second display unit 180b that is separately disposed inside the vehicle to display an image related to a driver assistance function. Specifically, the second display unit 180b may be the display of a vehicle navigation device or the front cluster inside the vehicle.

The second display unit 180b may include at least one of a liquid crystal display (LCD), a thin film transistor-liquid crystal display (TFT LCD), an organic light-emitting diode (OLED), a flexible display, a 3D display, and an e-ink display. Such a second display unit 180b may be combined with a gesture input unit to form a touch screen. An image in front of the vehicle can be displayed on such a second display unit 180b, and a graphic image I may be further displayed to assist in vehicle driving in addition the front image so that it is possible to implement augmented reality.

Although in the following description, the first display unit 180a is mostly described, the image in front of the vehicle can be displayed on the second display unit 180b and when the graphic image I for assisting in vehicle driving in addition to the front image is displayed thereon, the description of the first display unit 180a may also be applied to the second display unit 180b.

The display device 100 for the vehicle can further include the audio output unit 185 and the power supply unit 190. Specifically, the audio output unit 185 may output, through sound, a description on the function of the display device 100 for the vehicle, a message checking whether to execute the function or the like. That is, the display device 100 for the vehicle can supplement a description on the function of the display device 100 for the vehicle through the sound output of the audio output unit 185, in addition to a visual display through the display unit 180.

The power supply unit 190 may receive external power or internal power by the control of the processor 170 to supply power needed for the operation of each component. Lastly, the display device 100 for the vehicle can include the processor 170 that controls the overall operations of each unit in the display device 100 for the vehicle.

Figure 3:
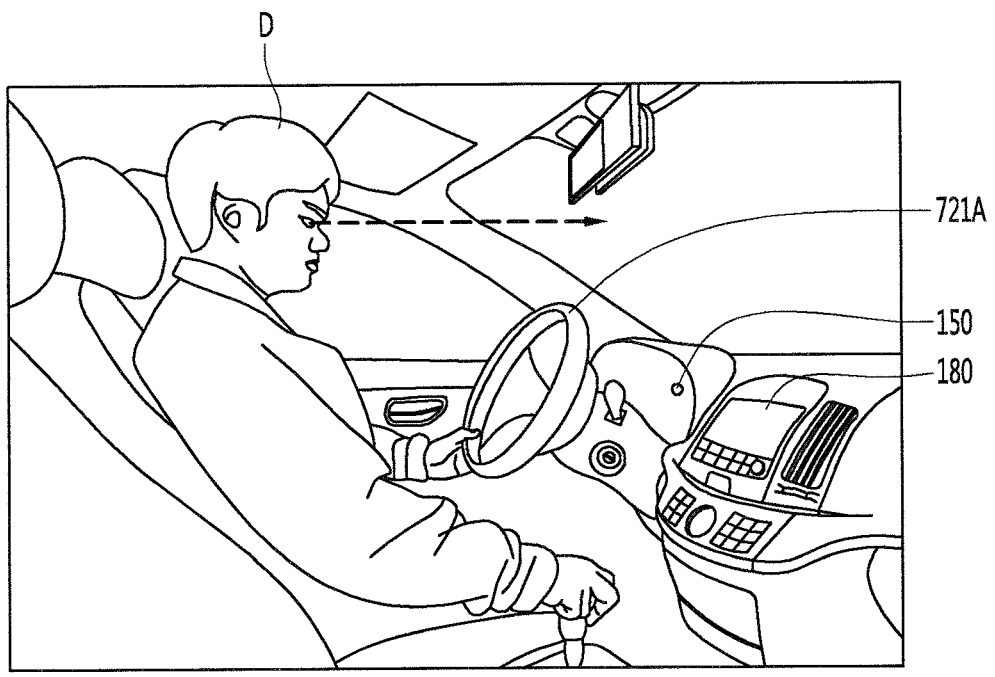
FIG. 3 represents an example of a method of detecting a situation inside a vehicle according to an embodiment.
Figure 4:
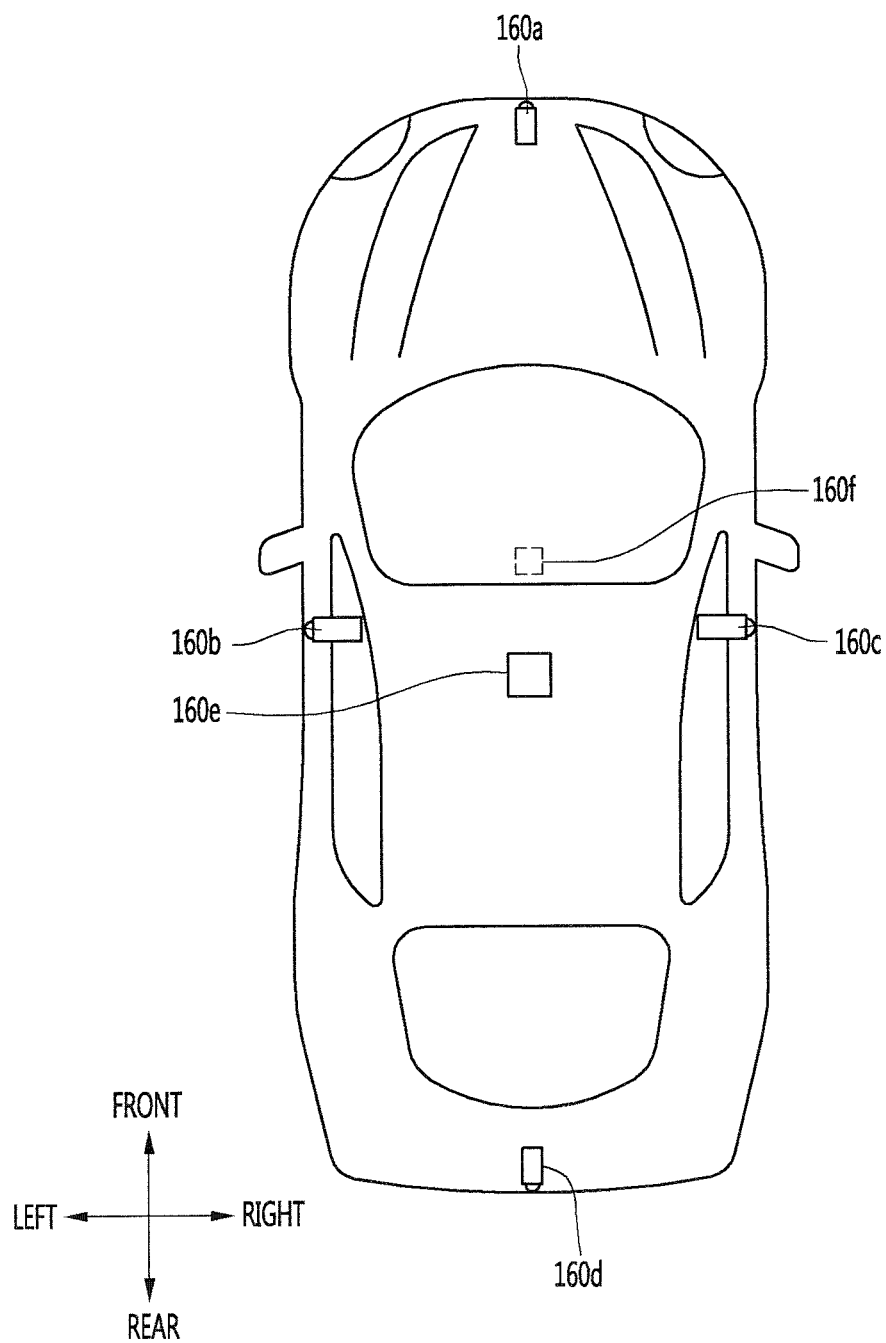
FIG. 4 is a plane view of a display device for a vehicle according to an embodiment.

The processor 170 can control at least some of the components discussed with reference to FIG. 3, in order to execute an application program. Furthermore, the processor 170 can combine and operate at least two of the components in the display device 100 for the vehicle in order to execute the application program.

The processor 170 can be implemented by using at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, and electrical units for executing other functions.

In addition, such a processor 170 can be controlled by a control unit or control various functions of the vehicle 700 through the control unit. In addition, the processor 170 typically controls the overall operations of the display device 100 for the vehicle, in addition to operations related to the application program stored in the memory 140. The processor 170 can process a signal, data, information, or the like input or output through the above-described components or execute the application program stored in the memory 140 to provide appropriate information or function to a user or process related information or function.

Specifically, the processor 170 can determine a graphic image display method corresponding to information on the detected object around the vehicle, and enable the display unit to display a graphic image according to the determined graphic image display method. Here, the determination of the graphic image display method may be at least one of the position of the graphic image on the windshield, the size, transparency, saturation, and color of the graphic image, and the amount of information displayed by the graphic image. That is, the processor 170 can display the graphic image corresponding to information on the object around the vehicle to enhance a graphic image identification level and prevent the gaze of a driver from becoming distracted.

In the following, various examples of determining the graphic image display method corresponding to the information on the object around the vehicle are described. In the following, the process of displaying, by the display device 100 for the vehicle a graphic image on the windshield according to a situation around the vehicle is described with reference to FIG. 9, and FIGS. 10a to 10d are provided for example.

Firstly, the monitoring unit 150 of the display device 100 for the vehicle can acquire information on the gaze of a driver in step S101. The reason for acquiring the information on the gaze of the driver is to check through which area of the windshield the driver sees an external object. Specifically, the processor 170 can detect an area of the windshield through which the external object is seen, and determine a graphic image display method, such as the display position or size of a graphic image or the amount of information displayed by the graphic image based on the detected area.

That is, the graphic image is displayed on the windshield in consideration of the positional relationship with a projected area of the windshield in which the external object is seen. Thus, the monitoring unit 150 can acquire a facial image of the driver and the processor 170 can detect the position of the face of the driver or the eyesight direction of the driver to acquire information on the gaze of the driver.

In addition, the display device 100 for the vehicle can acquire an image of the windshield matching the gaze of the driver that is acquired through the camera 160, in step S103. Specifically, the camera 160 can acquire a windshield image having the same view point as an image that the driver sees through the windshield. That is, the windshield image acquired by the camera 160 may match a situation outside the vehicle that the driver sees through the windshield.

Figure 10A:
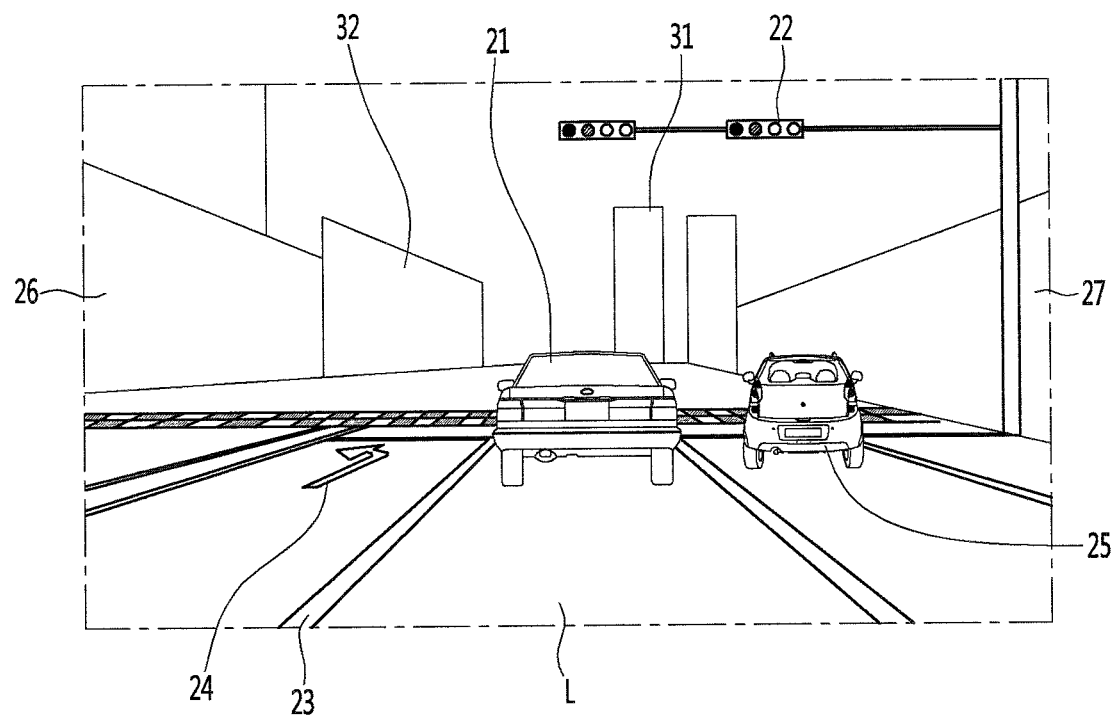
FIGS. 10a to 10d are diagrams illustrating a method of displaying, display device for a vehicle according to an embodiment, a navigation image while driving.

Thus, the processor 170 can also analyze the windshield image to detect an object from the windshield image and display a graphic image according to the position of the object and an occupied area. For example, FIG. 10a illustrates a situation outside the vehicle that the driver sees through the windshield, and may be a windshield image acquired by the camera 160.

Next, the processor 170 can detect an object around the vehicle from the windshield image in step S105. Here, the object around the vehicle can be an object that the driver should carefully observe while driving, and include another vehicle, a pedestrian, a traffic sign (e.g., a lane, traffic light, or crosswalk) that represents traffic information, and other objects (e.g., a curb, street trees, or a building).

If the graphic image is displayed on the objects that the driver should carefully object, the gaze of the driver may be distracted, accurate recognition may be difficult, and identification may be difficult because the graphic image overlaps the objects. Thus, the display device 100 for the vehicle can detect an object around the vehicle that the driver should pay attention to, display the graphic image so that an area of the windshield onto which the detected object is projected does not overlap, and thus it is possible to prevent the gaze of the driver from becoming distracted and enhance a graphic image identification level.

Further, these objects can be only those within a predetermined distance from the vehicle. That is, because the objects that are in a distance equal to or longer than the predetermined distance from the vehicle are not ones that the driver should pay attention and do not affect graphic image identification, they may be excluded. For example, referring to FIG. 10a, the processor 170 can detect, as objects around the vehicle, a lane 23, a left-turn traffic sign 24, a traffic light 22, a first front vehicle 21, a second front vehicle 25, and surround buildings 26 and 27 from the windshield image.

In addition, it is possible to determine a graphic image display position in consideration of the detected objects around the vehicle. Specifically, if a graphic image is displayed on the front vehicle, the driver may have difficulty in identifying the front vehicle and especially in determining a distance to the front vehicle. Thus, the processor 170 needs to detect objects that the driver should observe while driving, and display the graphic image so it does not obstruct the identification of the detected object.

Therefore, the processor 170 can determine that the lane 23, the left-turn traffic sign 24, the traffic light 22, the surrounding buildings, the first front vehicle 21, and the second front vehicle 25 are objects around the vehicle. However, it is possible to determine that the buildings 26 and 27 within a predetermined distance among the surrounding buildings are objects around the vehicle, and buildings 31 and 32 that are in a distance equal to or longer than the predetermined distance may be excluded.

If the objects around the vehicle are detected, the processor 170 can detect a display area to display a graphic image in step S107. Specifically, the processor 170 can set remaining areas other than areas of the windshield image onto which the objects around the vehicle are projected, as display areas to display graphic images.

Figure 10B:
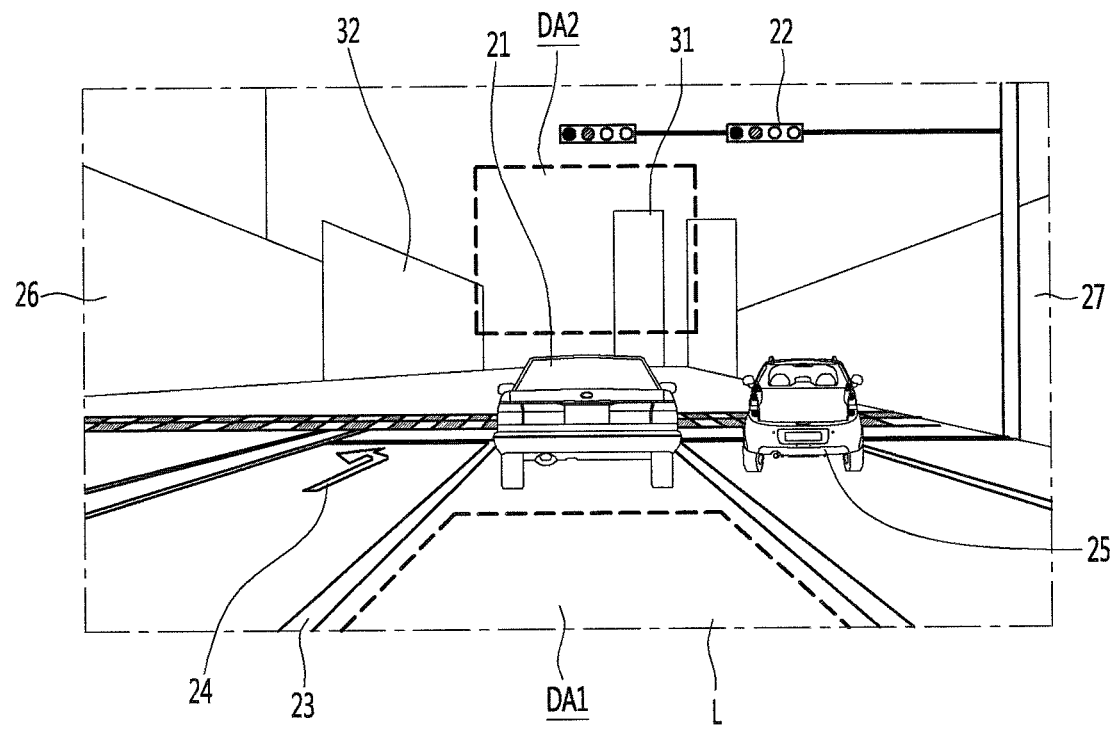
Figure 10C:
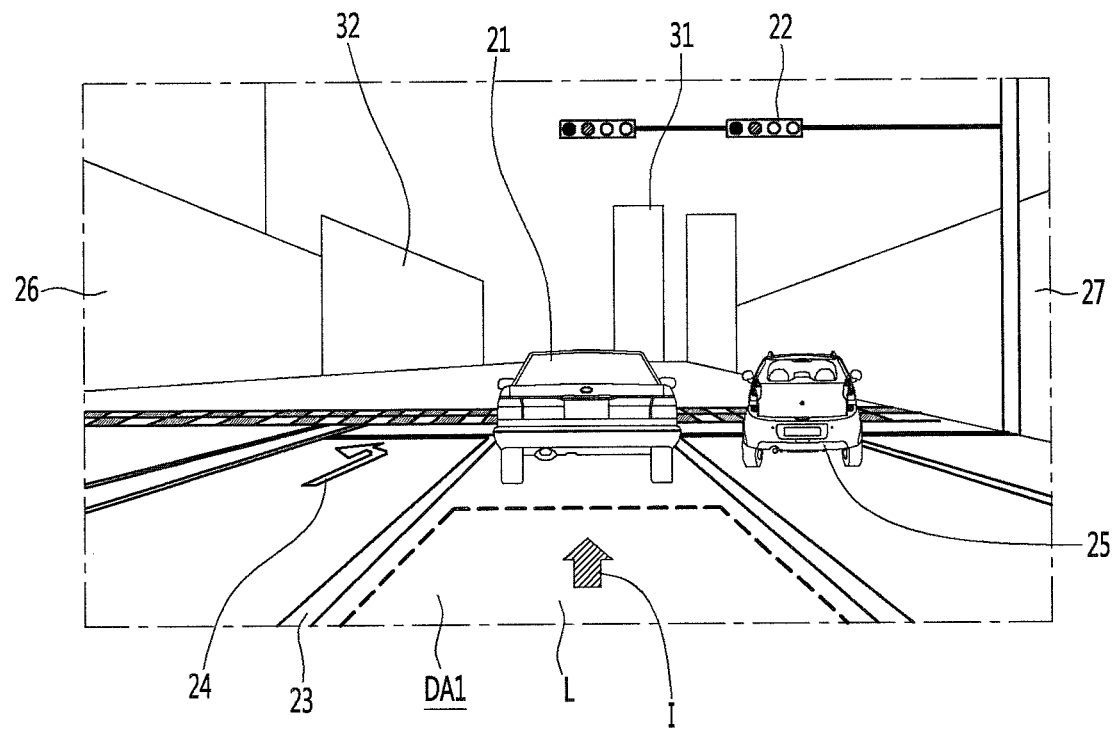

For example, referring to FIG. 10b, the processor 170 can display a navigation image for route guidance using a graphic image. In this instance, the processor 170 can display the navigation image on the driving road L and the upper area (e.g., a background are perpendicular to the driving road) of the driving road L to enable the driver to more intuitively receive navigation information.

That is, the processor 170 can set, as display areas DA1 and DA2, the driving road L and a remaining area excluding the front vehicle 21 from the upper area of the driving road L. Specifically, it is possible to set the driving road L that is under the front vehicle 21, as a first display area DA1, and the upper area of the front vehicle 21 as a second display area DA2.

That is, the processor 170 can set, as the display area, positions for displaying graphic images on the windshield so that the front vehicle 21 on the driving road L does not overlap the graphic images. In addition, the processor 170 can display graphic images according to the display areas in step S109.

In particular, the processor 170 can determine graphic images to be displayed on the display areas according to a size and a position, and display the determined graphic images on the display areas. For example, referring to FIG. 10c, the processor 170 can display a navigation image I on the first display area DA1 when the first display area DA1 has a sufficient size. If the distance between the vehicle and the front vehicle 21 gradually increases, and the size of the first display area DA1 decreases and is thus equal to or smaller than a predetermined size, it may be difficult to display the navigation image I on the first display area DA1.

Figure 10D:
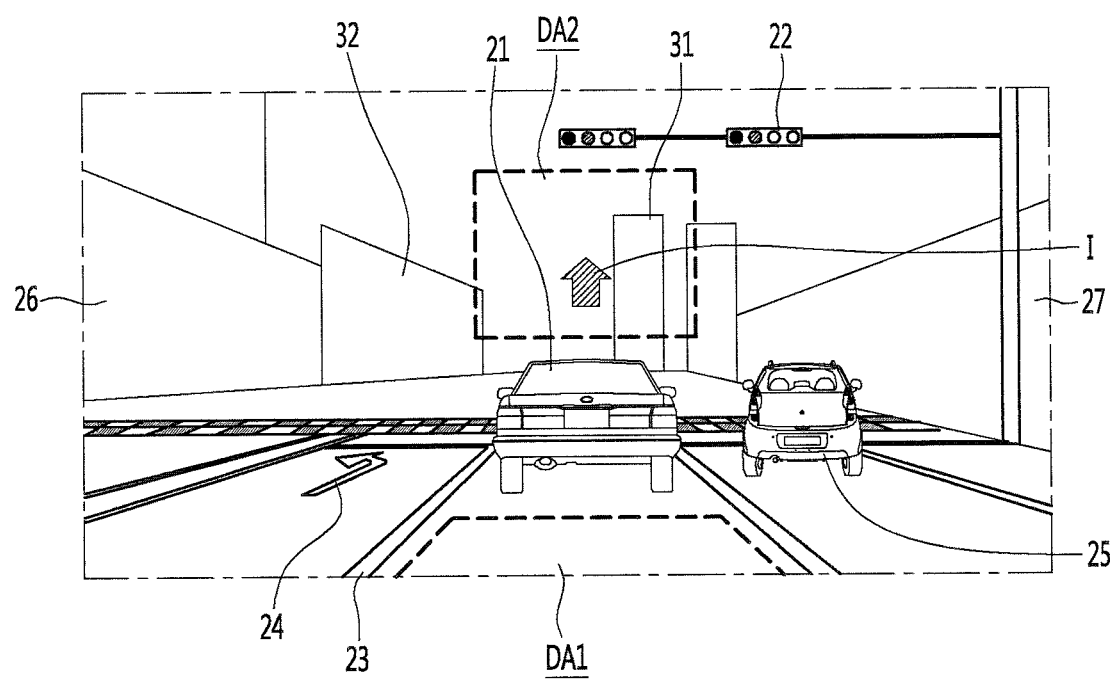

Referring to FIG. 10d, the processor 170 can display a graphic image on the second display area DA2 that is the upper area of the front vehicle 21 (which is above the driving road L) if the first display area DA1 is smaller than the predetermined size. That is, the processor 170 can continue to detect a display area according to a variation in situation around the vehicle and display the graphic image on the detected display area. In another aspect, the processor 170 can display the navigation image I on the driving road L when the distance to the front vehicle 21 is equal to or longer than a predetermined distance, and display the navigation image I above the front vehicle 21 if the distance to the front vehicle 21 is shorter than or equal to the predetermined distance by driving.

In summary, the processor 170 can display the navigation image I on the driving road L if it is determined that the size of an area the driving road L on the windshield is sufficient, and display the navigation image I above the front vehicle 21 if the front vehicle 21 hides the driving road L so that the driver may continue to identify the navigation image I. That is, the display device 100 for the vehicle according to an embodiment may display a graphic image at an appropriate position according to a surrounding situation to prevent the gaze of the driver from becoming distracted and provide a graphic image display function that has a high level of identification.

Figure 11A:
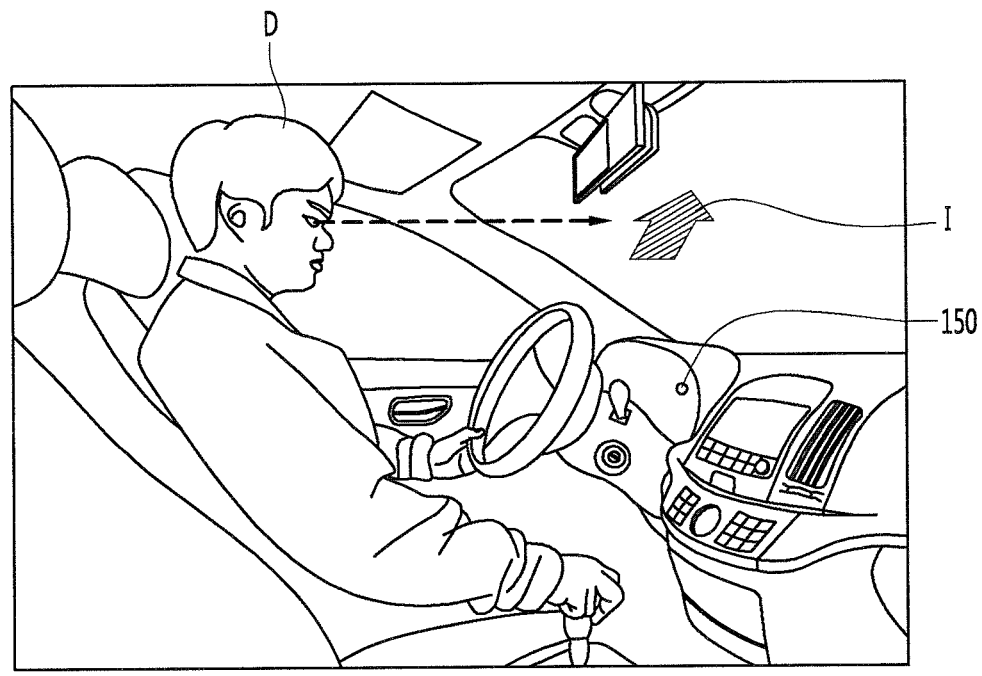
FIGS. 11a and 11b are diagrams illustrating a method of monitoring, by a display device for a vehicle according to an embodiment, a driver and displaying a graphic image according to the monitored information.

In the following, a particular example of displaying, by the display device 100 for the vehicle, a graphic image by using various display methods according to a variation in particular situation around the vehicle is described with reference to FIGS. 11a to 23. Referring to FIG. 11a, the display device 100 for the vehicle can detect the eyesight direction of a driver D, and display a graphic image I on the windshield based on the detected eyesight direction. In particular, it is possible to display the graphic image I at areas of the windshield corresponding to the driving road L or the upper area of the driving road L that are seen through the windshield, as described earlier.

Figure 11B:
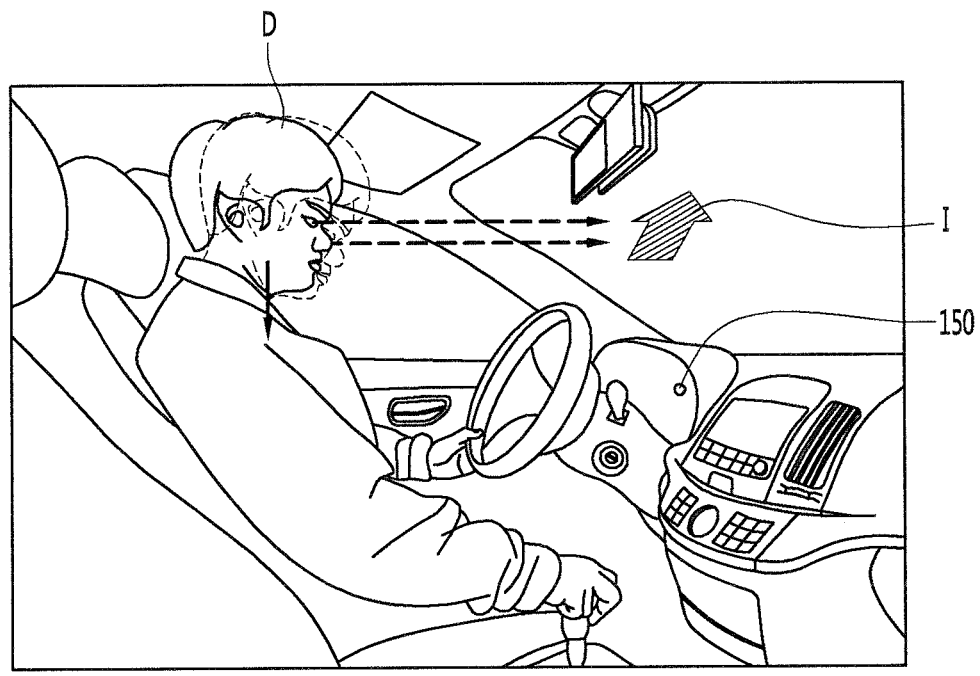

However, as shown in FIG. 11b, if the eyesight direction of the driver D varies, an area of the windshield through which the driving road L is seen also varies, and thus there may be limitation in that the driver D sees a view in which an object overlaps the graphic image I if the graphic image I is displayed at the same position as before.

That is, when the graphic image I and a surrounding image form and display augmented reality, the positional relationship between the graphic image I and the surrounding object may go wrong if the eyesight direction of the driver D varies. In order to prevent this, the processor 170 can correct and move the position of the graphic image I together according to a variation in the eyesight direction of the driver D so that the positional relationship between the surrounding object and the graphic image I is constantly maintained.

That is, if a variation in gaze of the driver D is detected, the processor 170 can move the graphic image I together according to the detected variation in gaze so that the driver D recognizes that the positional relationship between the graphic image I and a reference object is fixed.

Next, the display device 100 for the vehicle can change the amount of information or size of the graphic image I to be displayed according to the size or position of a display area. Specifically, referring to FIG. 12a, the processor 170 can detect a front vehicle 41 and left and right buildings 42 as objects around the vehicle, and set an area excluding them as a display area DA3. In this instance, the display area DA3 may have a relatively large size corresponding to the horizontal direction of the windshield.

Figure 12A:
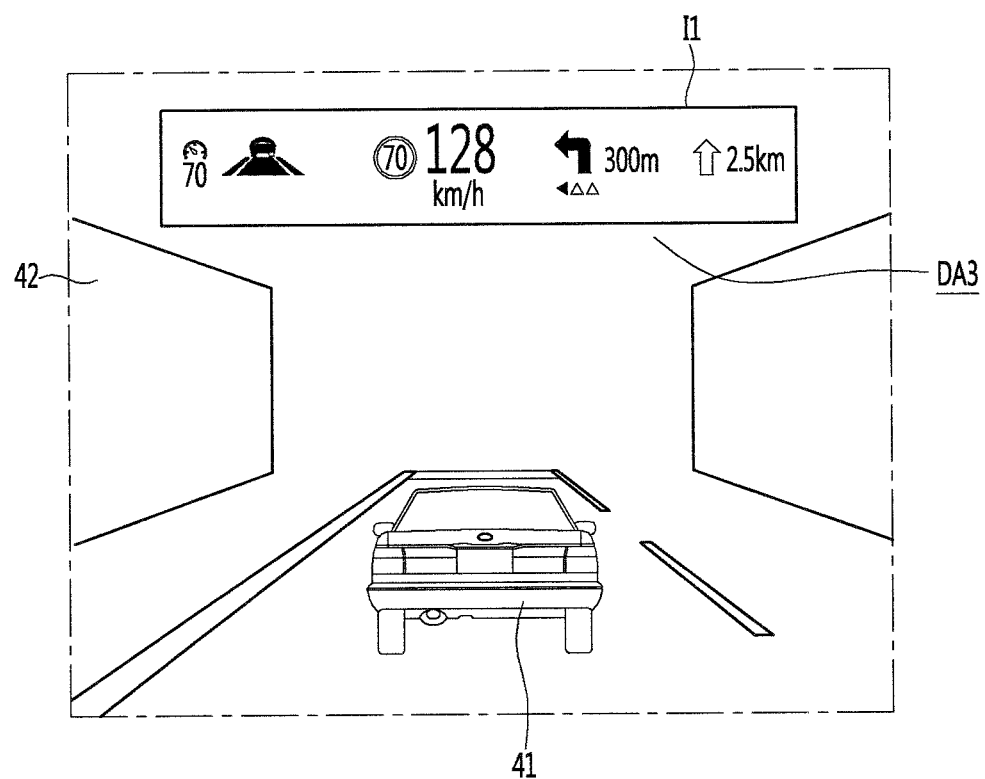
FIGS. 12a and 12b are diagrams illustrating a method of displaying, by a display device for a vehicle according to an embodiment, a graphic image according to the size of a display area.

Thus, the processor 170 can increase the amount of information on a graphic image I to be displayed on the display area DA3. For example, the processor 170 can further include, as information to be displayed as the graphic image I, not only a navigation image I but also surrounding traffic information, the current vehicle speed, newly entering section information, or the like. That is, as shown in FIG. 12a, a graphic image I1 may have a bar shape corresponding to the size of the display area DA3 and include images representing the surrounding traffic information, the current vehicle speed, and the newly entering section information.

Figure 12B:
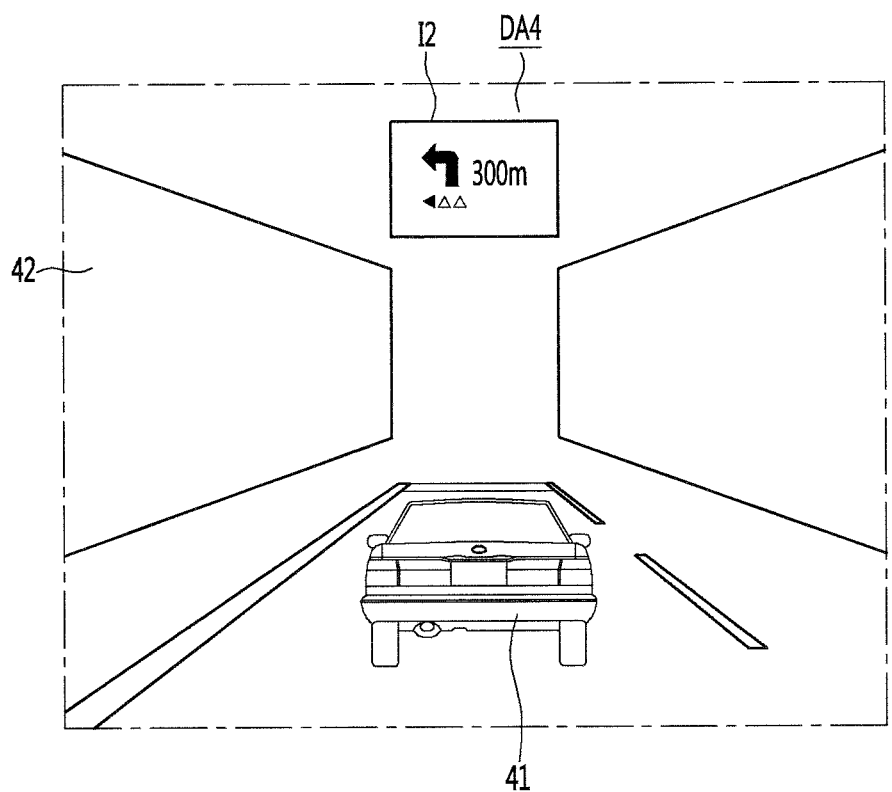

The processor 170 can detect that the size of the display area is reduced by surrounding objects. Referring to FIG. 12b, it can be seen that the size of a display area DA4 decreases due to an increase in area of the windshield in which the surrounding buildings 42 are seen. If the size of the display area DA4 decreases, the processor 170 can decrease the amount of information on a graphic image I2 corresponding to the decreased size of the display area DA4.

For example, as shown in FIG. 12b, the processor 170 can display only a navigation image I2 having high importance on the display area DA4. That is, if the processor 170 detects that there are many objects around the vehicle and thus there is a complex situation, the processor 170 can simply display the graphic image I to increase the delivery of information having high importance, and if there are a few objects around the vehicle and thus an area to display the graphic image I widens, it is possible to provide a lot of information to enhance the convenience of a driver.

Next, the display device 100 for the vehicle can also change and display the graphic image I according to the speed of the vehicle. The processor 170 can display a bar-shaped graphic image on the lower end of the windshield. Specifically, since the lower area of the windshield is an area in which the bonnet of the vehicle is seen, it is possible to fix the lower area as a display area and display the bar-shaped graphic image.

The processor 170 can increase the amount of information on the graphic image I to be displayed on the display area when the speed of the vehicle is slow. For example, the processor 170 can further include, as information to be displayed as the graphic image I, not only a navigation image but also surrounding traffic information, the current vehicle speed, newly entering section information, or the like.

Figure 13A:
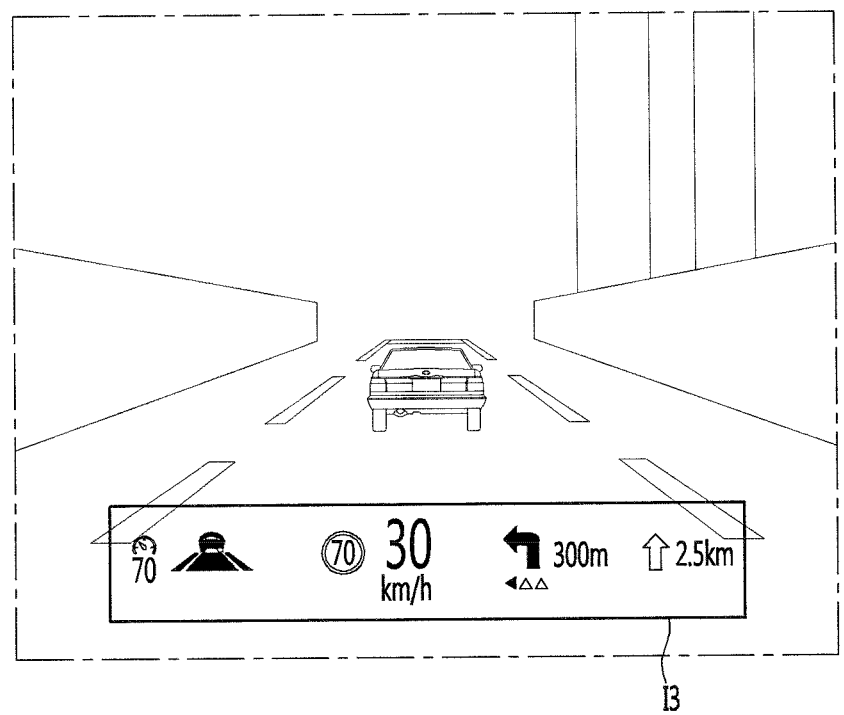
FIGS. 13a and 13b are diagrams illustrating a method of displaying, by a display device for a vehicle according to an embodiment, a graphic image according to the speed of the vehicle.

That is, as shown in FIG. 13a, a graphic image I3 may have a bar shape of a size corresponding to the horizontal direction of the windshield and include images representing the surrounding traffic information, the current vehicle speed, and the newly entering section information. The processor 170 can detect from sensor information that the speed of the vehicle is equal to or higher than a predetermined speed.

Figure 13B:
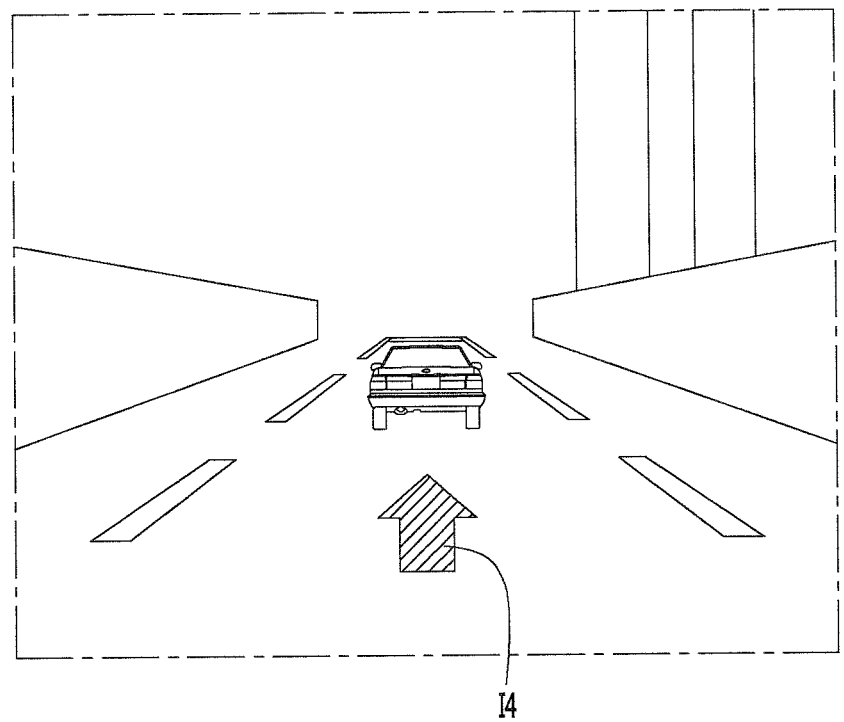

In addition, if it is detected that the speed of the vehicle is equal to or higher than the predetermined speed, the processor 170 can decrease the amount of information on a graphic image and the size of the graphic image. For example, as shown in FIG. 13b, the processor 170 can display only a navigation image I4 having high importance on a display area.

That is, when the vehicle quickly travels, the display device 100 for the vehicle can simply display the graphic image I4 to increase the delivery of information having high importance, and when the vehicle slowly travels and thus an area to display the graphic image I3 widens, it is possible to provide a lot of information to enhance the convenience of a driver.

Next, the display device 100 for the vehicle can determine and display a graphic image display method according to surrounding traffic. Specifically, referring to FIG. 14a, the processor 170 can detect that the vehicle is running on the community or local road and thus there is no or a few vehicles.

Figure 14A:
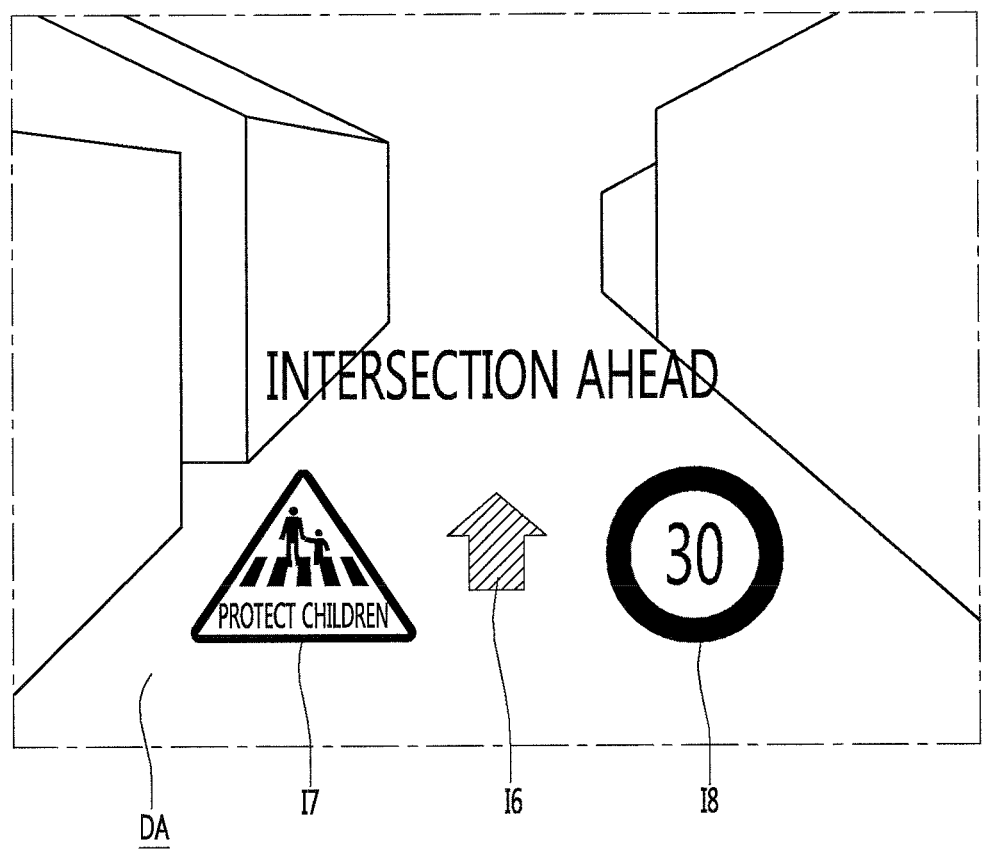
FIGS. 14a and 14b are diagrams illustrating a method of displaying, by a display device for a vehicle according to an embodiment, a graphic image according to traffic around the vehicle.

The processor 170 can increase the amount of information on the graphic image I in a section that has little traffic. For example, the processor 170 can further include, as information to be displayed as the graphic image I, not only a navigation image I6 but also surrounding traffic information I7, limit speed information I8 or the like. That is, as shown in FIG. 14a, the processor 170 can display, in a display area DA, the graphic image I7 that represents a "Protect children" section, the navigation image I6, and a graphic image I8 that represents limit speed, while driving on the community road.

Figure 14B:
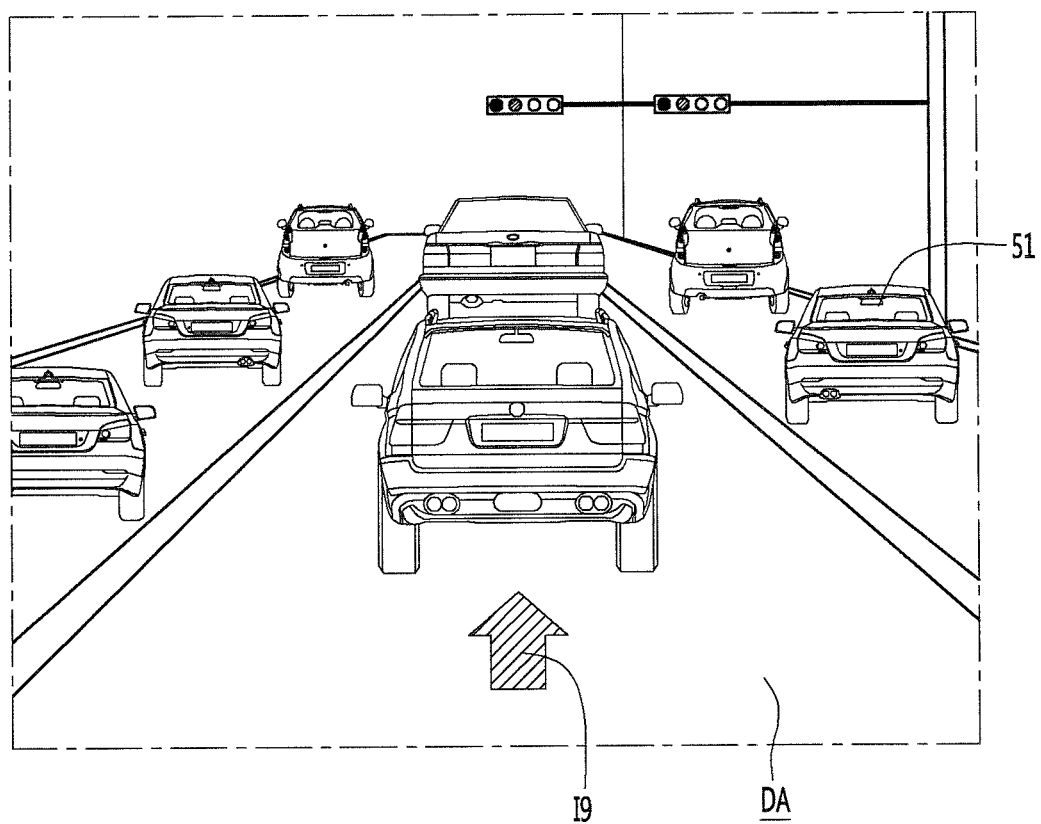

The processing 170 can determine that there is a lot of traffic, if many other vehicles are detected around the vehicle. Referring to FIG. 14b, it can be seen that many surrounding vehicles 51 are detected and thus there is a busy traffic situation. The processor 170 can decrease the amount of information on a graphic image I9 in a section in which there is a lot of traffic, and decrease the size of the graphic image I9.

For example, as shown in FIG. 14b, the processor 170 can display only a navigation image I9 having high importance on a display area. That is, when there is a lot of surrounding traffic, the display device 100 for the vehicle can simply display the graphic image I9 to increase the delivery of information having high importance, and when there is little traffic, it is possible to provide a lot of information to enhance the convenience of a driver.

Figure 15A:
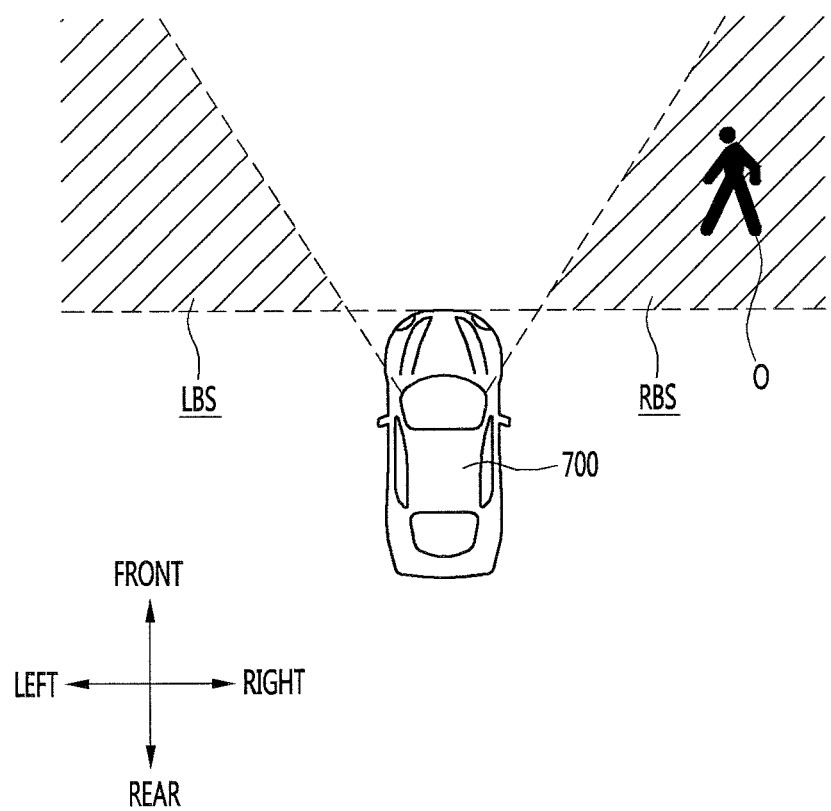
FIGS. 15a to 15c are diagrams illustrating a method of displaying, by a display device for a vehicle according to an embodiment, a graphic image for warning of the dangerous objects in a blind spot.

Next, if an object having a risk of collision is detected from a blind spot, the display device 100 for the vehicle can display a warning graphic image. Referring to FIG. 15a, the display device 100 for the vehicle can detect, through a sensor unit, an object O from a left blind spot LBS and a right blind spot RBS that are not seen on the windshield.

Specifically, if the processor 170 detects the object O that moves from the left blind spot LBS to the right or moves from the right blind spot RBS to the left, it is possible to determine that the object is a collision risk object O. If the collision risk object is detected from the blind spot, the processor 170 can display a graphic image warning that there is the collision risk object.

Figure 15B:
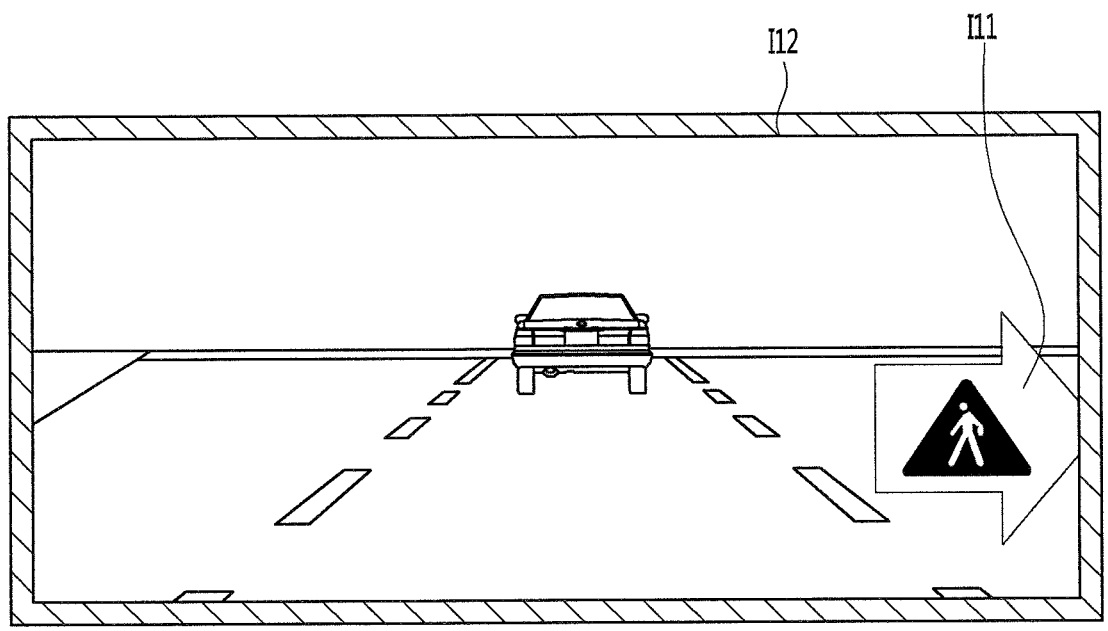

Specifically, referring to FIG. 15b, the processor 170 can display a first graphic image I11 that represents the presence and direction of the collision risk object on an area of the windshield corresponding to a direction in which the collision risk object is located. In particular, the processor 170 can display the first graphic image I11 representing a right arrow and warning on the rightmost of the windshield when the collision risk object is detected from the right blind spot RBS.

In addition, the processor 170 can display a second graphic image I12 displayed on the four edges of the windshield to clearly deliver the meaning of warning to a driver. The processor 170 can display a graphic image having a high level of identification gradually according to the degree of risk of collision (the distance between the object and the vehicle).

For example, the shorter the distance to the collision risk object is, the processor 170 can increase the saturation, brightness or size of a graphic image, and repetitively display a graphic image to enhance a level of identification. The display device 100 for the vehicle can also display a graphic image I warning a collision risk in consideration of the view area of a driver.

Specifically, since the driver has a difficulty in seeing the entire windshield at a look, the processor 170 can detect a view area that the driver mostly sees, through the monitoring unit 150. For example, the processor 170 can set the viewing angle of a general person to about 60 degrees and determine that an area of the windshield within 60 degrees based on the eyesight direction of the driver is the view area of the driver.

Figure 15C:
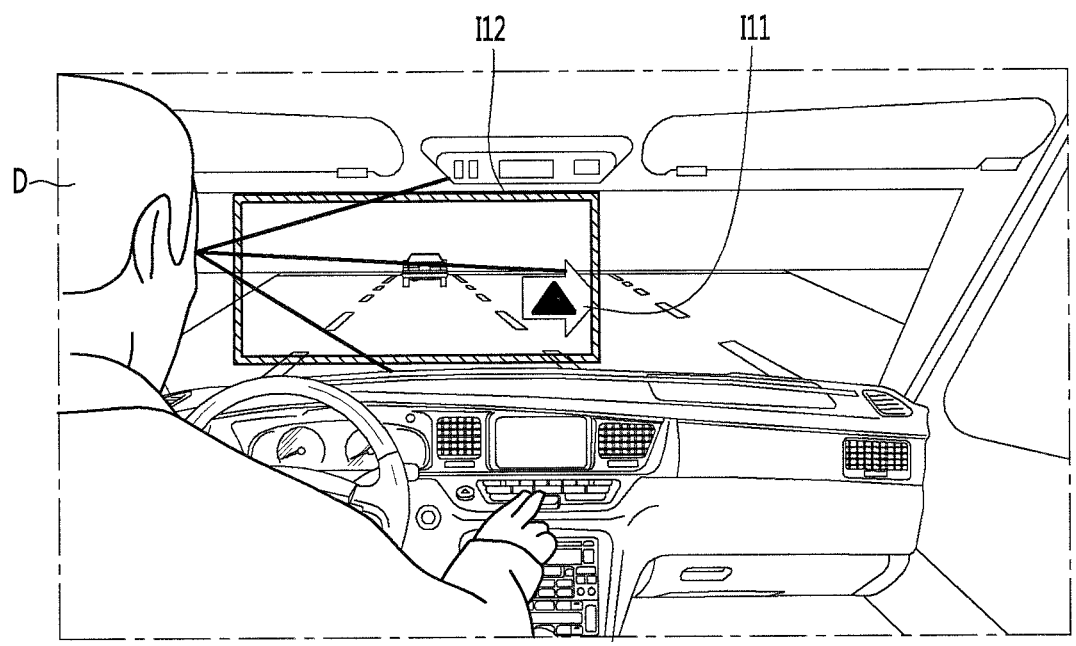

More particularly, referring to FIG. 15c, it is possible to designate the upper boundary line of the view area as the upper boundary line of the windshield, the lower boundary line thereof as a point at which the bonnet of the vehicle is seen, the left boundary line thereof as the left boundary line of the windshield, and the right boundary line as a point which decreases by 60 degrees from the eyesight direction of the driver (e.g., a point that is about 103 cm away on the right from the gaze of the driver).

In addition, the first graphic image I11 and the second graphic image I12 that warn the collision risk as described above may be displayed in the view area of the driver. Specifically, as shown in FIG. 15c, the processor 170 can display the second graphic image I12 on the edges of the view area of the driver and display the first graphic image I11 on the right boundary line of the view area of the driver.

That is, the display device 100 for the device may display the graphic image I in an area of the windshield corresponding to the eyesight direction of the driver to clearly deliver caution information to the driver. The display device 100 for the vehicle can also display a graphic image so that the image overlaps an object around the vehicle in a special situation. Specifically, the display device 100 for the vehicle can detect steering state of the vehicle from sensor information and display a graphic image warning lane 23 departure if it is predicted that the steering state of the vehicle departs the lane.

Figure 16A:
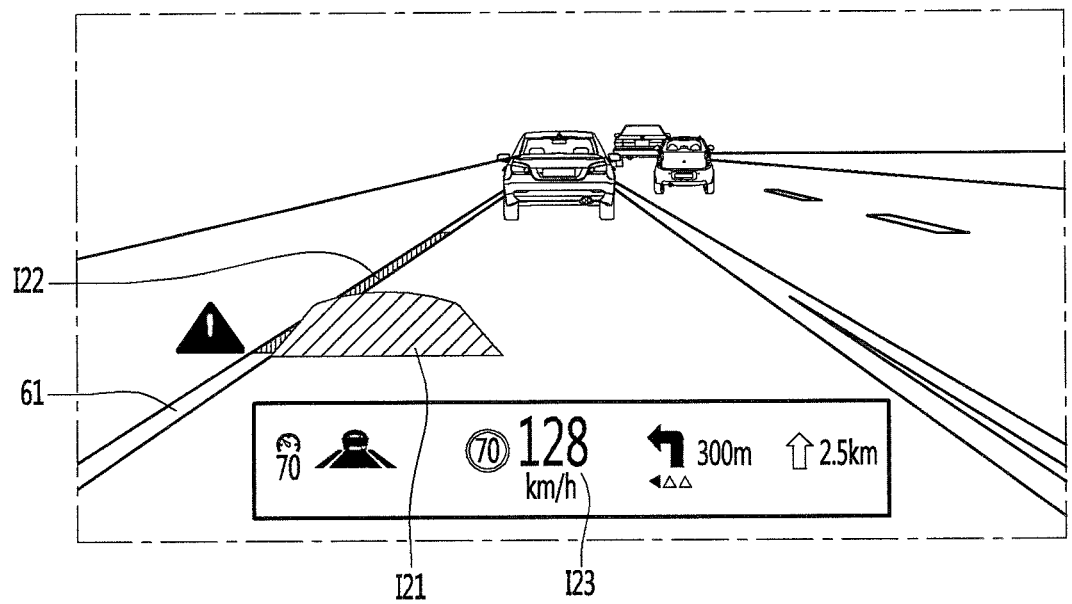
FIGS. 16a and 16b are diagrams illustrating a method of displaying, by a display device for a vehicle according to an embodiment, a graphic image for warning of lane departure.

Referring to FIG. 16a, the display device 100 for the vehicle can display a graphic image I22 representing the risk of lane 61 departure, at a lane 61 from which departure is performed due to the current steering state, in order to effectively warn of lane 61 departure. The display device 100 for the vehicle can predict the running direction of the vehicle to display, as a virtual graphic image I22, a place to which the vehicle moves so that it is possible to more intuitively deliver that the graphic image I22 is an image warning of lane 61 departure.

That is, the display device 100 for the vehicle can detect the lane 61 from which the vehicle departs, based on the steering and speed of the vehicle and display the graphic image I22 warning of lane departure in the detected lane 61 so that the driver intuitively perceives that he or she is in a lane 61 departure situation.

The display device 100 for the vehicle can further display, at the lower end of the windshield, a graphic image I23 representing a navigation image, running speed or the like in a bar shape. In addition, the display device 100 for the vehicle can use the bar shape provided at the lower end in an urgent situation, such as lane departure to warn the driver of the urgent situation.

Figure 16B:
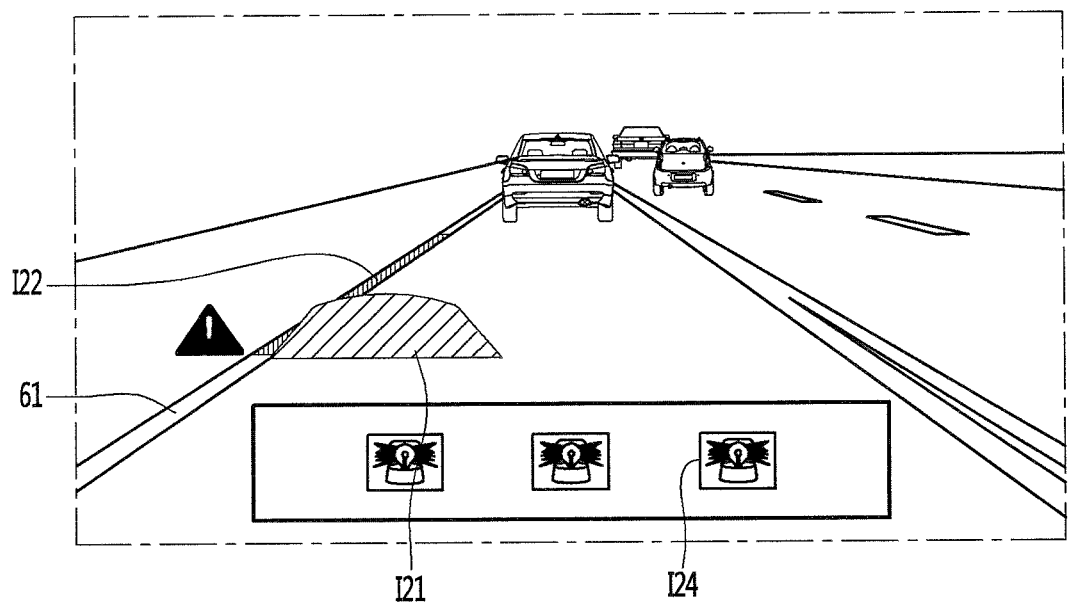

For example, as shown in FIG. 16b, the display device 100 for the vehicle can replace a typically displayed bar shape graphic image I23 with a graphic image I24 representing the urgent situation to more clearly deliver the urgent situation to the driver. Also, if the urgent situation is detected and it is determined that the driver fails to see the urgent situation, the display device 100 for the vehicle can also display, in the eyesight direction of the driver, a graphic image I representing the urgent situation.

Figure 17:
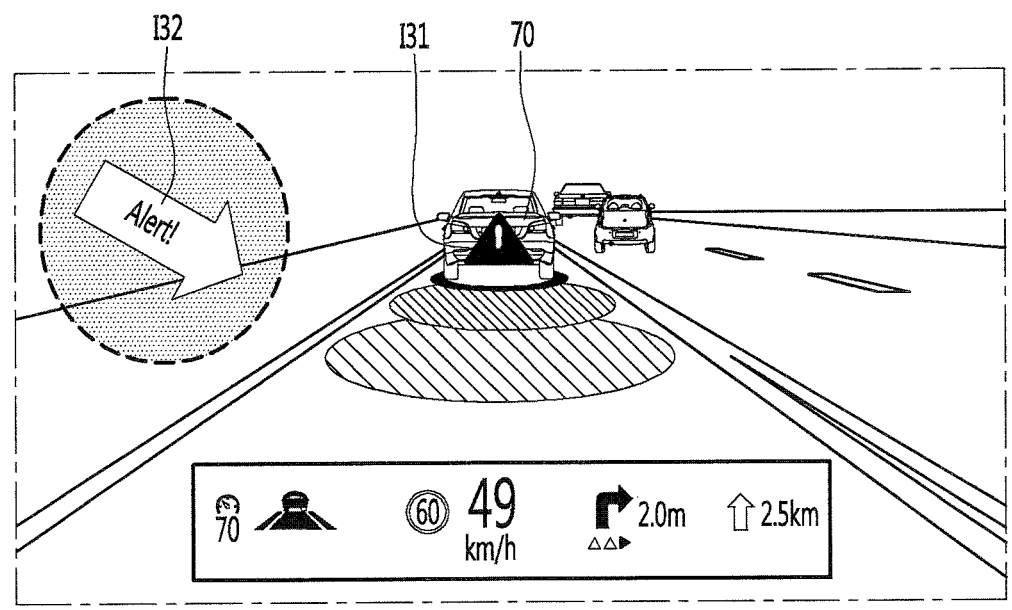
FIG. 17 is a diagram illustrating a method of displaying, by a display device for a vehicle according to an embodiment, a graphic image when a collision risk object does not match the eyesight direction of a driver.
Figure 18A:
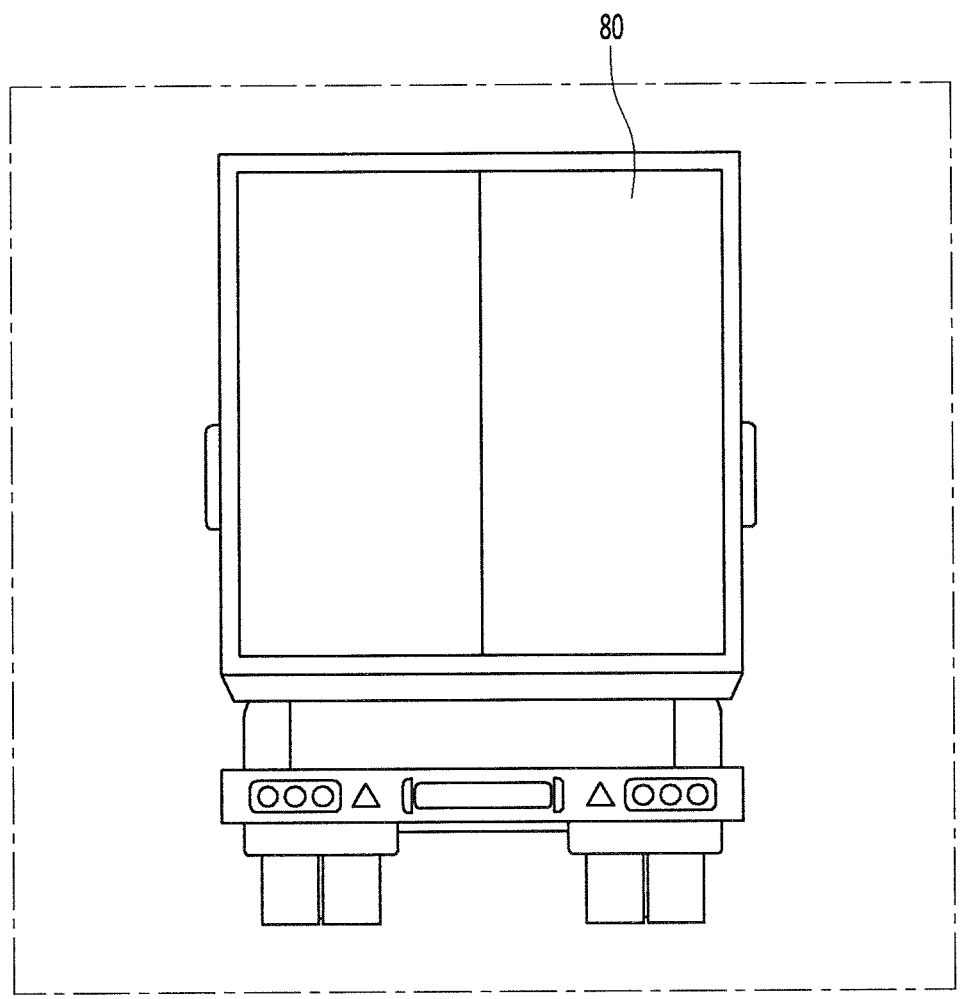
FIGS. 18a and 18b are diagrams illustrating a method of displaying, by a display device for a vehicle according to an embodiment, a graphic image overlapping with an object around the vehicle.
Figure 18B:
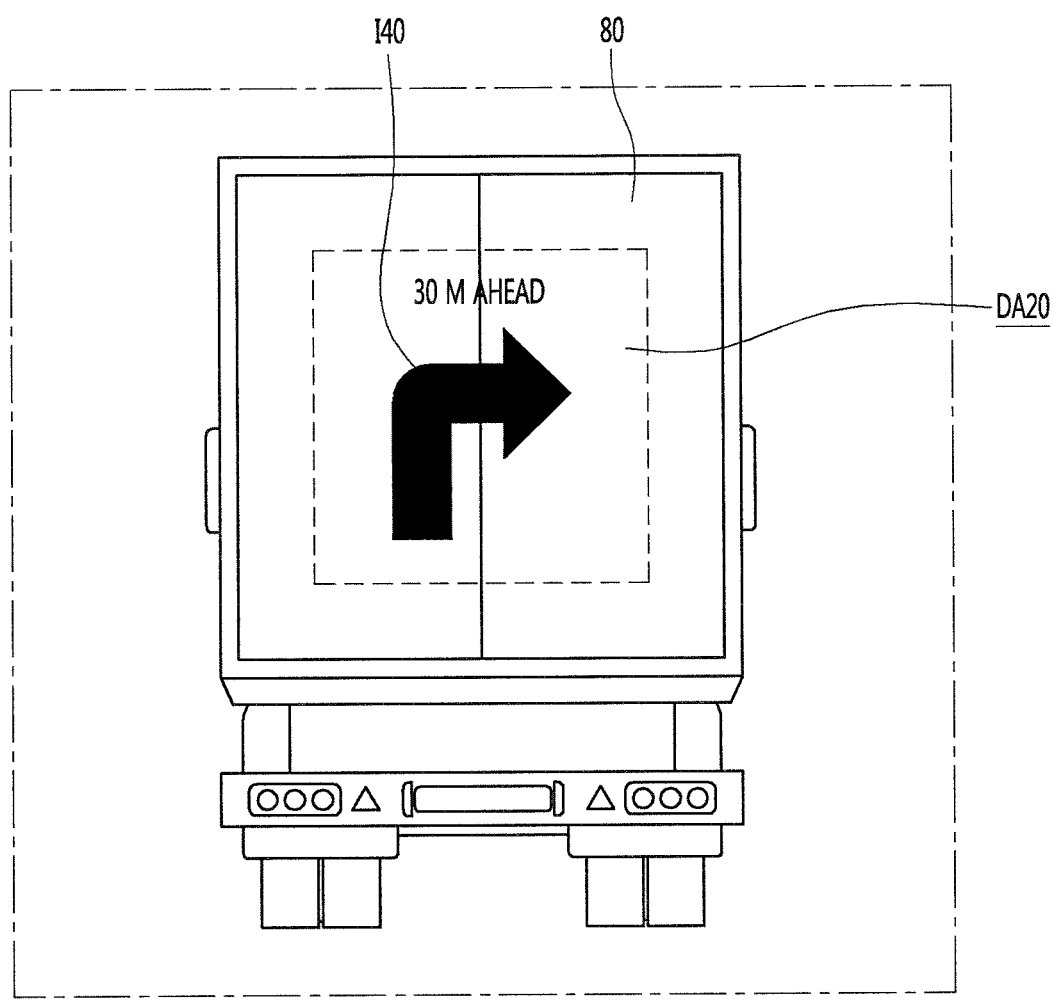

Specifically, referring to FIG. 17, the processor 170 can detect the urgent situation through a sensor unit when a front vehicle 70 suddenly decreases the speed. In this instance, the processor 170 can display a first graphic image I31 representing the risk of collision with the front vehicle 70 so the image overlaps with the front vehicle 70. In addition, the processor 170 can detect that the gaze of the driver that is detected through the monitoring unit 150 faces another area (e.g., upper left end), not the front vehicle 70.

That is, if a place where the urgent situation occurs does not match the eyesight direction of the driver, the processor 170 can display the graphic image I32 indicating the place where the urgent situation occurs, in an area of the windshield corresponding to the eyesight direction of the driver to enable the gaze of the driver to move to the place where the urgent situation occurs.

That is, the display device 100 for the vehicle can overlap a first graphic image I31 warning of the risk of collision with a collision risk object and display a second graphic image I32 indicating the risk of collision in the eyesight direction of the driver to enable the driver to quickly perceive a collision risk situation, thus it is possible to decrease the risk of an accident.

The display device 100 for the vehicle can display a graphic image I so that the image overlaps an object around the vehicle in another special situation. Specifically, referring to FIG. 18a, the display device 100 for the vehicle can detect that there is no area to display a graphic image because most areas of the windshield are hidden by a front large vehicle 80, when the distance to the large vehicle 80 is short.

That is, the display device 100 for the vehicle can designate, as a display area, a predetermined area in the front vehicle 80, not an area excluding the front vehicle 80. Specifically, referring to FIG. 18b, the processor 170 can designate the intermediate area of the front vehicle 80 as a display area DA20 and display a navigation image I40 in the display area.

That is, the processor 170 can detect a clean area to display the graphic image I40, designate the clean area as the display area DA20 and then display the graphic image I40 therein. The display device 100 for the vehicle can display a navigation image by a carpet image having predetermined transparency. The carpet image can guide to a specific lane on which the vehicle drives, to provide detailed navigation information so that the driver can more easily drive.

Figure 19:
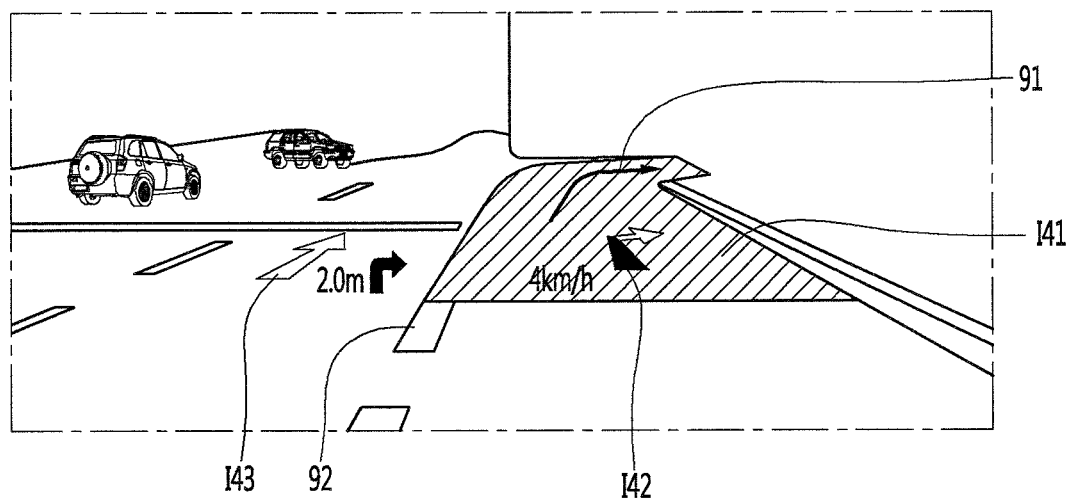
FIG. 19 is a diagram representing an example of displaying, by a display device for a vehicle according to an embodiment, a navigation image.

Specifically, referring to FIG. 19, the display device 100 for the vehicle can display the carpet image I41 on the driving road to perform route guidance, if the driving road is well seen through the windshield. In this instance, the display device 100 for the vehicle can further display graphic images I42 and I43 that highlight objects representing various pieces of traffic information displayed on the driving road so that the carpet carpet image I41 does not hide the traffic information and thus a driver identifies the traffic information.

The display device 100 for the vehicle can effectively display the carpet image according to a variation in situation around the road. Also, referring to FIG. 21a, in order to effectively show the driving road while increasing a level of identification of the driving road, the display device 100 for the vehicle can use a plurality of arrows having predetermined transparency to display a navigation image I51. In addition, the display device 100 for the vehicle can also display, at the lower end of the windshield, the graphic image I52 that represents the speed of the vehicle and future route guidance.

Figure 20A:
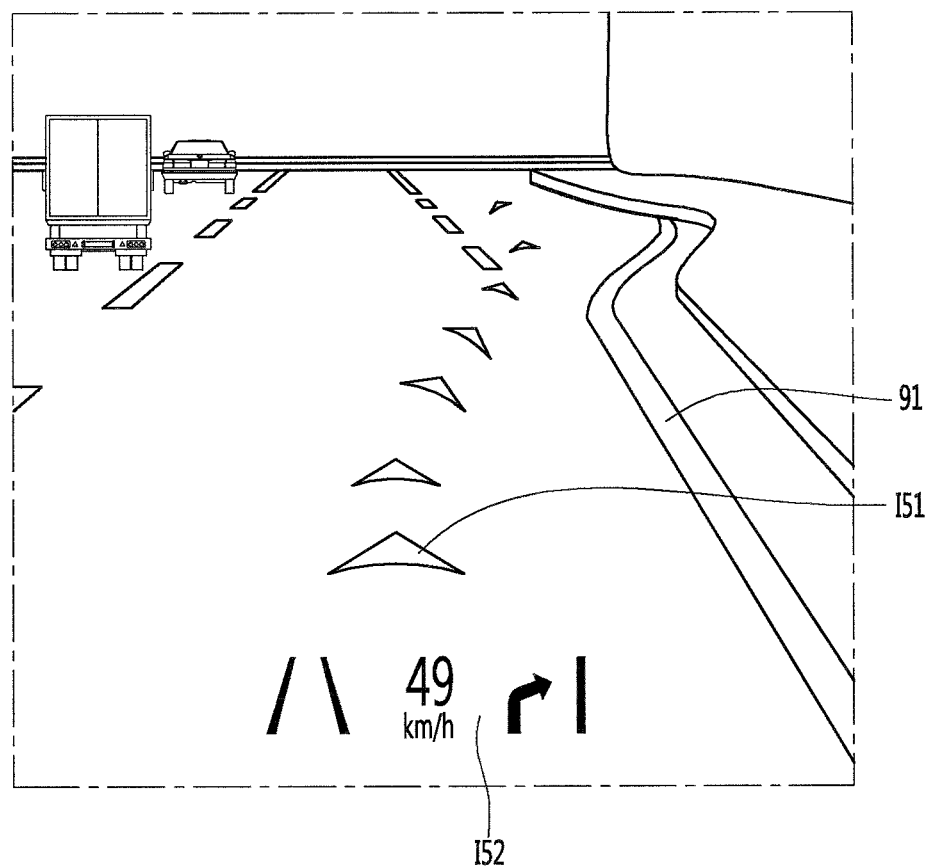
FIGS. 20a and 20b are diagrams illustrating representing another example of displaying, by a display device for a vehicle according to an embodiment, a navigation image.
Figure 20B:
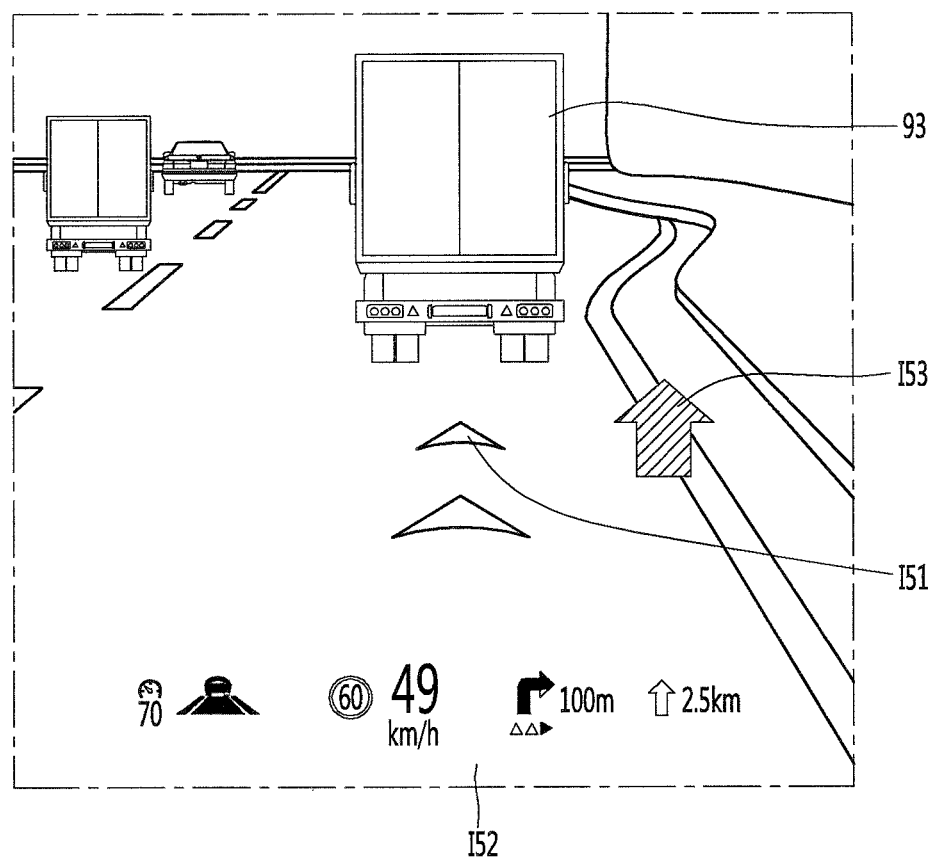

Referring to FIG. 20b, a navigation image I51 display area may decrease due to entrance of another vehicle 93 into the driving road. That is, the processor 170 can display an additional navigation image I53 around the other vehicle 93 that hides the navigation image I, if it is detected that the area of the navigation image I displayed on the driving road is hidden to a certain extent.

That is, the display device 100 for the vehicle can continue to detect a situation around the vehicle and display the additional graphic image I53 when a driver has a difficulty in identifying the existing graphic image I. The display device 100 for the vehicle can further display a graphic image that represents information on a point of interest (POI) around the vehicle. For example, the display device 100 for the vehicle can further display a graphic image that represents the POI, if there is commercial in which the driver is interested, at the destination of the vehicle or around the vehicle.

Figure 21:
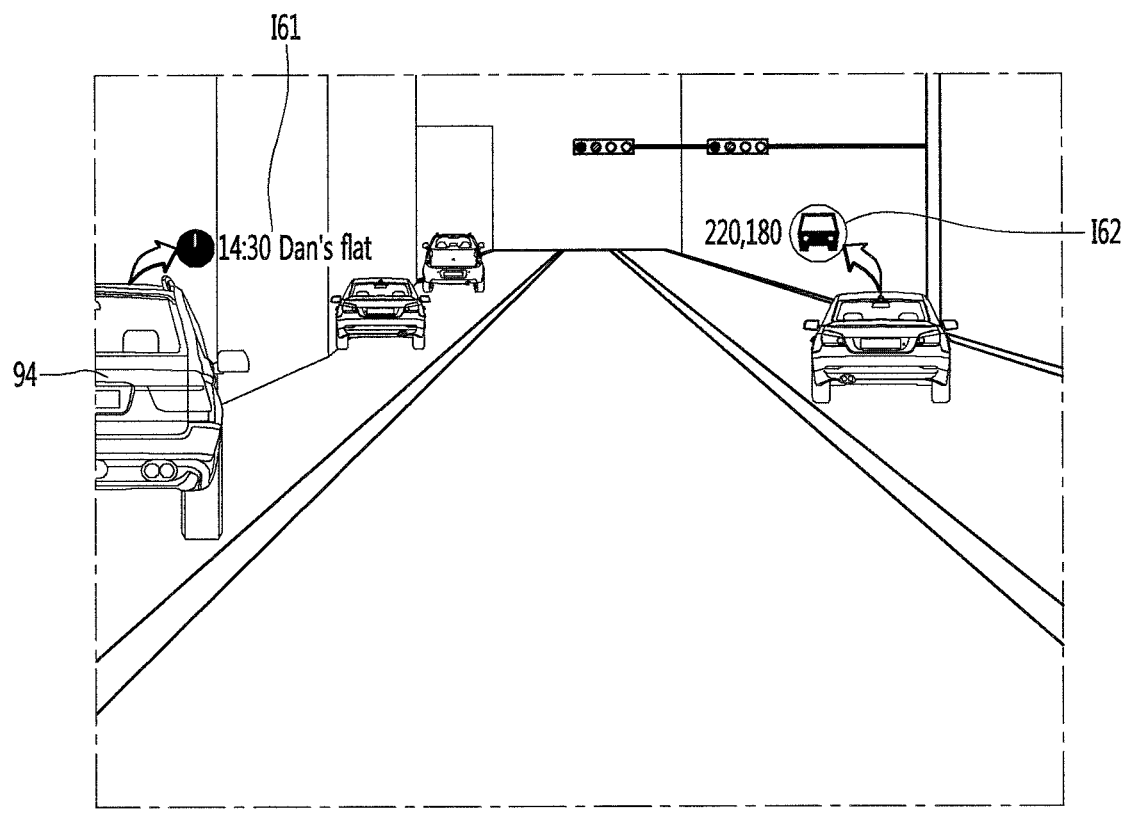
FIG. 21 represents a method of displaying, by a display device for a vehicle according to an embodiment, a graphic image that represents information on a point of interest.
Figure 22:
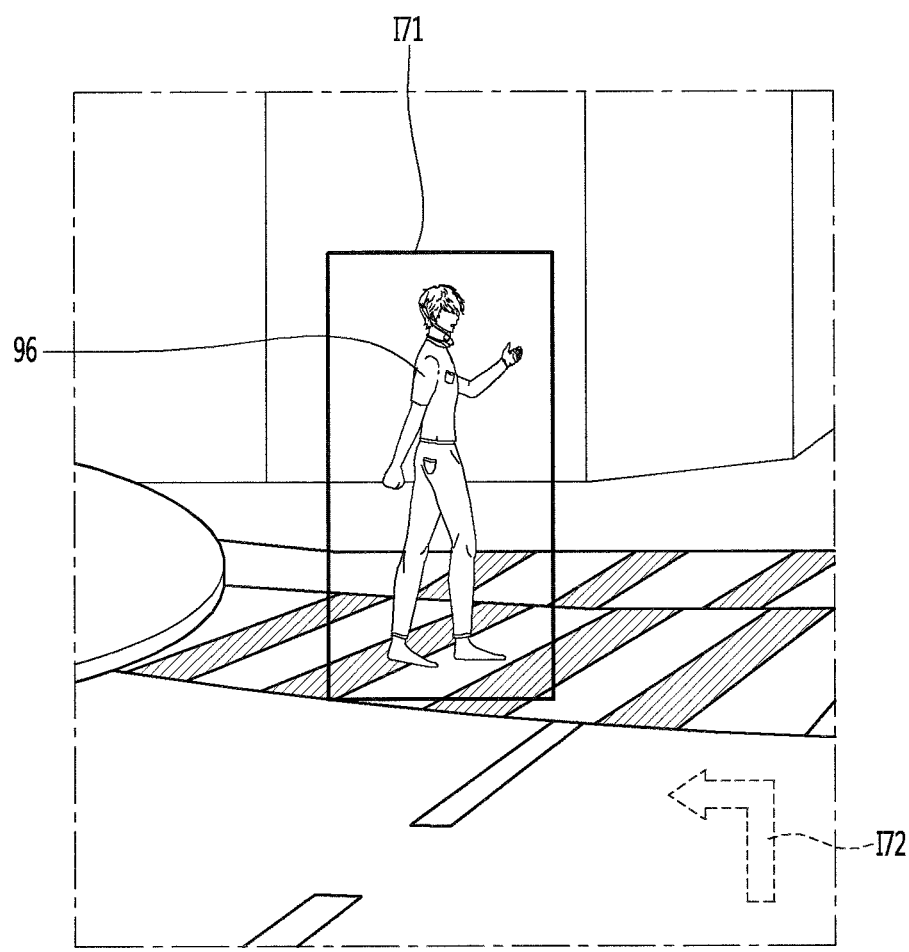
FIG. 22 is a diagram illustrating a method of displaying, by a display device for a vehicle according to an embodiment, a graphic image when detecting an object that has a high degree of risk.
Figure 23:
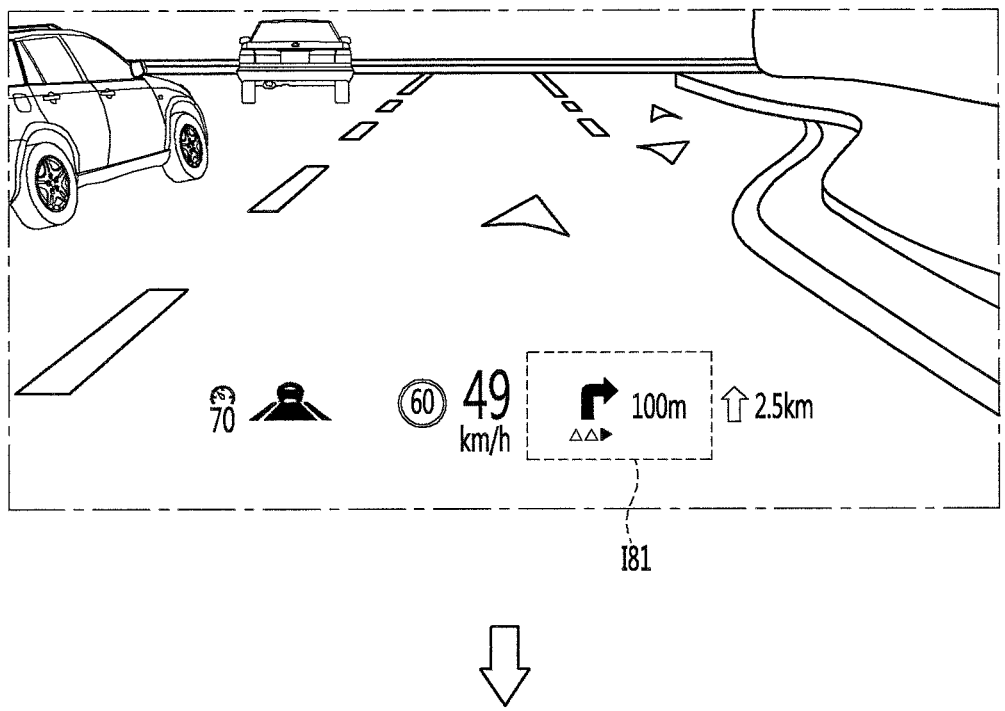
FIG. 23 is a diagram illustrating a method of changing and displaying, a display device for a vehicle according to an embodiment, a graphic image according to navigation information.
Figure 23:
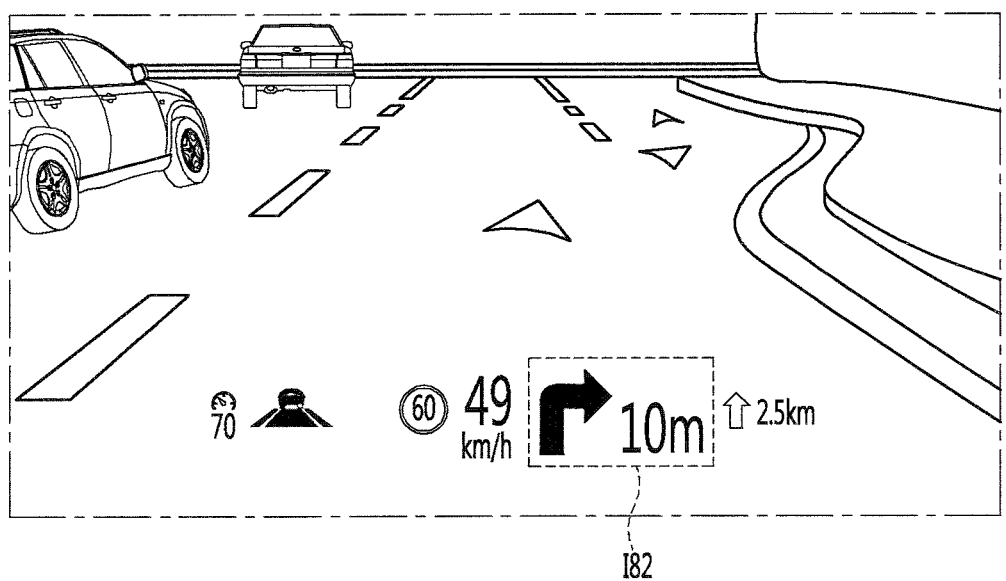

Referring to FIG. 21, the display device 100 for the vehicle can further include a graphic image I61 that represents a destination 95, when the vehicle is near the destination. However, when another object 94 hides the destination 95, the graphic image I61 may not deliver accurate information.

In order to overcome such a limitation, the display device 100 for the vehicle can detect the position of the destination 95 and display the graphic image I61 that includes an arrow image extended from the destination and an image representing destination information, when the destination 95 is hidden by the object 64. The display device 100 for the vehicle can determine the degree of risk of the detected object and change a graphic image display method according to the degree of risk.

Here, the degree of risk of the object may be determined based on the type of the object, and for example, the degree of risk may decrease in order of a pedestrian, a two-wheeled vehicle, and a vehicle. The degree of risk of the object may be determined by the distance to the vehicle, the degree of risk of collision, or the like.

In addition, the display device 100 for the vehicle can change and display a graphic image according to detected object information, when an object having the high degree of risk is detected. For example, referring to FIG. 22, when a pedestrian 96 is detected, the display device 100 for the vehicle can display a graphic image I71 that highlights the pedestrian 96, and control the saturation, brightness, size or the like of the previously displayed navigation image I72 to lower a level of identification of the image. For example, the first graphic image I71 that highlights the pedestrian may use red having high brightness to increase a level of identification, and it is possible to relatively lower the brightness of the navigation image I72 or display the image in light color to lower a level of identification.

The display device 100 for the vehicle can change a graphic image display method according to vehicle navigation information. Specifically, referring to FIG. 23, the display device 100 for the vehicle can relatively decrease the size of a navigation image I81 if the navigation image representing right-turn has a long distance to the intersection, and increase the size of a navigation image I82 with a decrease in distance with the intersection. For example, the display device 100 for the vehicle can increase a right-turn sign with a decrease in distance to the intersection so that it is possible to deliver intuitive route guidance information to a driver.

In summary, the display device 100 for the vehicle can detect objects around the vehicle that are seen on the windshield, change a graphic image I display method according to information on the objects around the vehicle, and increase a level of identification of the graphic image I and at the same time, inhibit the gaze of a driver from becoming distracted.

Figure 24:
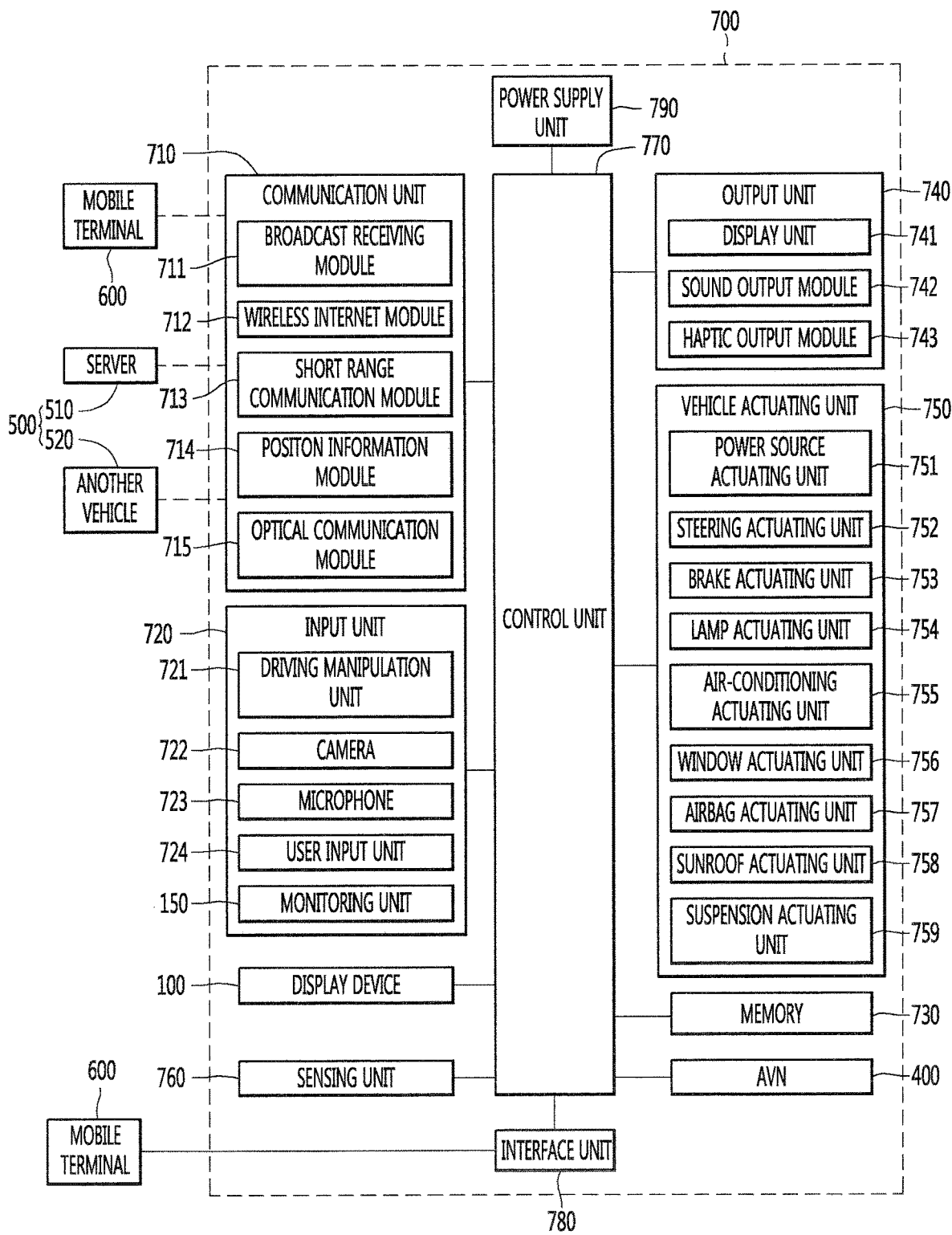
FIG. 24 is an example of an internal block diagram of a vehicle in FIG. 1 that includes the display device for the vehicle as described above.

Such a display device 100 for the vehicle can also be installed and implemented in the vehicle. Referring to FIG. 24, the display device for the vehicle as described earlier may be included in the vehicle. The vehicle can include a communication unit 710, an input unit 720, a sensing unit 760, an output unit 740, a vehicle actuating unit 750, a memory 730, an interface unit 780, a control unit 770, a power supply unit 790, the display device 100 for the vehicle, and an AVN device 400. Here, it is described that units that have the same name among the units in the display device 100 for the vehicle and the units in the vehicle 700 are included in the vehicle 700.

The communication unit 710 may include one or more modules that enable wireless communication between the vehicle and the mobile terminal 600, between the vehicle and the external sever 510, or between the vehicle and another vehicle 520. The communication unit 710 may include one or more modules that connect the vehicle to one or more networks. The communication unit 710 may include a broadcast receiving module 711, a wireless internet module 712, a short-range communication module 713, a position information module 714, and an optical communication module 715.

The broadcast receiving module 711 receives a broadcast signal or broadcast related information from an external broadcast management server through a broadcast channel. In this example, a broadcast includes a radio or TV broadcast. The wireless internet module 712 indicates a module for wireless internet access and may be built into or external to the vehicle. The wireless internet module 712 is configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 712 transmits/receives data according to at least one wireless internet technology including internet technologies not listed above. For example, the wireless internet module 712 may exchange data with the external server 510 wirelessly. The wireless internet module 712 may receive weather information or road traffic information (e.g., TPEG) from the external server 510.

The short-range communication module 713 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

Such a short-range communication module 713 may form a Wireless Area Network (WAN) to perform short-range communication between the vehicle and at least one external device. For example, the short-range communication module 713 may exchange data with the mobile terminal 600. The short-range module 713 may receive weather information or road traffic information (e.g., TPEG) from the mobile terminal 600. If a user gets in the vehicle, the mobile terminal 600 of the user and the vehicle can perform pairing on each other automatically or by the execution of an application by the user.

The position information module 714 is a module for acquiring the position of the vehicle and includes a GPS module as a typical example. For example, the vehicle can use a signal transmitted by a GPS satellite to acquire the position of the vehicle, when the GPS module is used.

The optical communication module 715 may include a light transmission unit and a light reception unit. The light reception unit may convert a light signal into an electrical signal to receive information. The light reception unit may include a photo diode (PD) for receiving light. The PD may convert light into an electrical signal. For example, the light reception unit may receive information on the front vehicle through light emitted from a light source that is included in the front vehicle.

The light transmission unit may include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency. According to an embodiment, the light transmission unit may include a plurality of light-emitting element arrays. According to an embodiment, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the other vehicle 520 through optical communication.

The input unit 720 may include the driving manipulation unit 721, a camera 195, a microphone 723, and a user input unit 724. The driving manipulation unit 721 receives a user input for driving the vehicle, and includes a steering input mechanism 721A, a shift input mechanism 721D, an acceleration input mechanism 721C, and a brake input mechanism 721B (see FIG. 8).

The steering input mechanism 721A receives an input for the travelling direction of the vehicle from a user. and may be a wheel so that a steering input may be performed by rotation. According to an embodiment, the steering input mechanism 721A may also be formed as a touch screen, touch pad or button.

The shift input mechanism 721D receives an input for the parking P, driving D, neutrality N, and rear movement R of the vehicle from the user. The shift input mechanism 721D may be formed in the form of a lever. According to an embodiment, the shift input mechanism 721D may also be formed as a touch screen, touch pad or button.

The acceleration input mechanism 721C receives an input for the acceleration of the vehicle from the user. The brake input mechanism 721B receives an input for the speed decrease of the vehicle from the user. The acceleration input mechanism 721C and the brake input mechanism 721B may be formed in the form of a pedal. According to an embodiment, the acceleration input mechanism 721C or the brake input mechanism 721B may also be formed as a touch screen, touch pad or button.

The camera 722 may include an image sensor and an image processing module. The camera 722 may process a still image or video that is obtained by the image sensor (e.g., CMOS or CCD). The image processing module may process the still image or video acquired by the image sensor to extract necessary information and transmit the extracted information to the processor 770.

The vehicle can include the camera 722 that captures images in front of the vehicle or images around the vehicle, and the monitoring unit 725 that captures an image of the interior of the vehicle. The monitoring unit 725 may acquire an image of a passenger. The monitoring unit 725 may acquire the image of the passenger for biometrics.

Although FIG. 31 shows that the monitoring unit 725 and the camera 722 are included in the input unit 720, the camera 722 may also be included in the display device for the vehicle as described above. The microphone 723 may process an external sound signal into electrical data. The processed data may be used in various methods according to a function that is executed at the vehicle. The microphone 723 may convert a user's voice command into electrical data. The electrical data obtained through conversion may be transmitted to the control unit 770.

According to an embodiment, the camera 722 or the microphone 723 may also be a component that is included in the sensing unit 760, and not in the input 720. The user input unit 724 receives information from the user. When information is input through the user input unit 724, the control unit 770 can control the operation of the vehicle corresponding to the input information. The user input unit 724 may include a touch-type input means or mechanical input means. According to an embodiment, the user input unit 724 may be disposed at a region of a steering wheel. In this instance, a driver may manipulate the user input unit 724 with his or her finger, holding the steering wheel.

The sensing unit 760 senses a signal relating to the driving of the vehicle. Thus, the sensing unit 760 may include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor by steering wheel rotation, a vehicle temperature sensor, a vehicle humidity sensor, an ultrasonic sensor, a radar, a Lidar, and so on.

Thus, the sensing unit 760 may acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on.

The sensing unit 760 may include a biometric recognition information sensing unit. The biometric recognition information sensing unit senses and acquires biometric recognition information on a passenger. The biometric recognition information may include fingerprint information, iris-scan information, retina-scan information, hand geometry information, facial recognition information, and voice recognition information. The biometric recognition information sensing unit may include a sensor that senses biometric recognition information of the passenger. In this instance, the monitoring unit 150 and the microphone 723 may operate as sensors. The biometric recognition information sensing unit may acquire hand geometry information and facial recognition information through the monitoring unit 725.

The output unit 740 is used for outputting information processed by the control unit 770 and may include the display unit 741, the sound output unit 742, and the haptic output unit 743. The display unit 741 may display information processed by the control unit 770. For example, the display unit 741 may display vehicle related information. In this example, the vehicle related information may include vehicle control information for direct control over the vehicle or driver assistance information for a driving guide for a driver. The vehicle related information may include vehicle state information that indicates the current state of the vehicle, or vehicle operation information relating to the operation of the vehicle.

The display unit 741 may include at least one of an LCD, a TFT LCD, an OLED, a flexible display, a 3D display, and an e-ink display. The display unit 741 may form a mutual layer structure with a touch sensor or be integrally formed to implement a touch screen. The touch screen may function as the user input unit that provides an input interface between the vehicle and the user, and also provide an output interface between the vehicle and the user.

In this instance, the display unit 741 may include a touch sensor sensing a touch of the display unit 741 to be capable of receiving a control command by the touch. Accordingly, when the display unit 741 is touched, the touch sensor senses the touch, and the control unit 770 can generate, based on the touch, a control command corresponding to the touch. A thing input by the touch may be a letter, a number, or a menu item that may be instructed or designated in various modes.

The display unit 741 may include a cluster so that a driver may see vehicle state information or vehicle operation information simultaneously with driving. The cluster may be located on the dashboard. In this instance, the driver may see information displayed on the cluster, maintaining forward view.

According to an embodiment, the display unit 741 may be implemented as a HUD. When the display unit 741 is implemented as the HUD, it is possible to output information through a transparent display that is installed on the windshield. Alternatively, the display unit 741 may include a projection module to output information by using image that is projected onto the windshield.

The sound output unit 742 converts an electrical signal from the control unit 770 into an audio signal and outputs the audio signal. Thus, the sound output unit 742 may include a speaker and so on. The sound output unit 742 may also output sound corresponding to the operation of the user input unit 724. The haptic output unit 743 generates a haptic output. For example, the haptic output unit 743 may enable a steering wheel, a safety belt and a seat to vibrate so that a user can recognize an output.

The vehicle actuating unit 750 may control the operations of various apparatuses of the vehicle. The vehicle actuating unit 750 may include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle. For example, when the power source is a fossil fuel based engine, the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor, the power source actuating unit 751 may control the motor. Thus, it is possible to control the speed, torque and so on of the motor. The steering actuating unit 752 may perform electronic control over a steering apparatus in the vehicle. Thus, it is possible to change the driving direction of the vehicle.

The brake actuating unit 753 may perform electronic control over a brake apparatus in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on. The air-conditioning actuating unit 755 may perform electronic control over an air conditioner in the vehicle. For example, when the temperature inside the vehicle is high, it is possible to operate the air conditioner so that cold air is supplied into the vehicle.

The window actuating unit 756 may perform electronic control over a window apparatus in the vehicle. For example, it is possible to open or close left and right windows of the vehicle. The airbag actuating unit 757 may perform electronic control over an airbag apparatus in the vehicle. For example, it is possible to operate an airbag in a risky situation.

The sunroof actuating unit 758 may perform electronic control over a sunroof apparatus in the vehicle. For example, it is possible to open or close the sunroof. The suspension actuating unit 759 may perform electronic control over a suspension apparatus in the vehicle. For example, when the road surface is uneven, it is possible to control a suspension apparatus to reduce the vibration of the vehicle.

The memory 730 is electrically connected to the control unit 770. The memory 770 can store fundamental data on units, control data for operation control over the units, and input and output data. The memory 790 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface 730 may function as a path to various kinds of external devices that are connected to the vehicle. For example, the interface unit 780 may include a port connectable to the mobile terminal 600 and be connected to the mobile terminal 600 through the port. In this instance, the interface unit 780 may exchange data with the mobile terminal 600.

The interface unit 780 may function as a path through which electrical energy is supplied to the mobile terminal 600. When the mobile terminal 600 is electrically connected to the interface unit 780, the interface unit 780 supplies electrical energy supplied from the power supply unit 790 to the mobile terminal 600 according to the control of the control unit 770.

The control unit 770 can control the overall operation of each unit in the vehicle. The control unit 770 can be named an electronic control unit (ECU). Such a control unit 770 can execute a function corresponding to a transmitted signal, according to the execution signal transmission of the display device 100 for the vehicle.

The control unit 770 can be implemented by using at least one of an ASIC, a DSP, a DSPD, a PLD, an FPGA, a processor, a controller, a micro-controller, a microprocessor, and other electrical units for executing functions. The control unit 770 can perform the role of the above-described processor 170. That is, the processor 170 of the driver assistance apparatus 100 may be set directly to the control unit 770 of the vehicle. In such an embodiment, it may be understood that the display device 100 for the vehicle refers to some components of the vehicle.

Alternatively, the control unit 770 can also control components to transmit information requested by the processor 170. The power supply unit 790 may supply power required for the operation of each component according to the control of the control unit 770. In particular, the power supply unit 770 can receive power from a battery in the vehicle.

The AVN apparatus 400 may exchange data with the control unit 770. The control unit 770 can receive navigation information from the AVN apparatus 400 or a separate navigation apparatus. In this example, the navigation information may include set destination information, route information according to the destination, vehicle driving related map information, or vehicle position information.

The display device for the vehicle according to the embodiment may display a graphic image on the windshield according to the position of an object around the vehicle to provide the graphic image to a driver by using the optimal display method according to a situation around the vehicle so that it is possible to effectively provide information without disturbing the driving of the driver.

In particular, the display device for the vehicle can set a display area so that the object shown through the windshield does not overlap the graphic image, and display the graphic image suitably for the size of the display area to effectively deliver necessary information without obstructing the view of a driver.

The display device for the vehicle can move the graphic image together according to a variation in gaze of a driver to enable the driver to recognize that the positional relationship between the graphic image and a reference object is fixed, thus it is possible to increase a level of identification of the graphic image. Also, if the display device for the vehicle detects that there are many objects around the vehicle and thus there is a complex situation, it may simply display the graphic image to increase the delivery of information having high importance, and if there are a few objects around the vehicle and thus an area to display the graphic image widens, it is possible to provide a lot of information to enhance the convenience of a driver.

When the vehicle quickly travels, the display device for the vehicle can simply display the graphic image to increase the delivery of information having high importance, and when the vehicle slowly travels and thus an area to display the graphic image widens, it is possible to provide a lot of information to enhance the convenience of a driver.

Also, when there is a lot of surrounding traffic, the display device for the vehicle can simply display the graphic image to increase the delivery of information having high importance, and when there is little traffic, it is possible to provide a lot of information to enhance the convenience of a driver. If the collision risk object is detected from the blind spot, the display device for the vehicle can display a graphic image warning that there is the collision risk object.

The display device for the device may display the graphic image in an area of the windshield corresponding to the eyesight direction of the driver to clearly deliver caution information to the driver.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A display device for a vehicle, the display device comprising:
    a camera configured to acquire an image around the vehicle;
    a display unit configured to display a first graphic image on a windshield of the vehicle; and
    a processor configured to:
    detect at least one object included in the acquired image viewed by a driver of the vehicle,
    determine information of the detected at least one object comprising a position and size of an area of the windshield in which the at least one object is viewed, and a type of the at least one object, and
    control the display unit to display the first graphic image on the windshield based on the determined information of the at least one object,
    wherein the processor is further configured to:
    set an area of the windshield excluding the area of the windshield in which the detected at least one object is viewed as a display area,
    determine an amount of information provided by the first graphic image corresponding to a size of the display area,
    determine a type of information provided by the first graphic image corresponding to the determined amount of information provided by the first graphic image in order of high importance,
    control the display unit to display the first graphic image on the display area,
    detect that the size of the display area is changed by the detected at least one object, and
    change the amount of information provided by the first graphic image corresponding to the changed size of the display area and display a changed graphic image on the display area;
    wherein a navigation image illustrating a route of the vehicle has the highest importance from among the information provided by the first graphic image, and wherein the processor is further configured to:
    set, as a first display area, a first projected area in which a driving road on which the vehicle drives is viewed,
    set, as a second display area, a second projected area in which an upper area of the driving road is viewed,
    control the display unit to display the navigation image in the first display area when a size of the first display area is equal to or larger than a predetermined size, and
    control the display unit to display the navigation image in the second display area when the size of the first display area is smaller than the predetermined size.

2. The display device for the vehicle according to claim 1, wherein the detected at least one object includes at least one of a front vehicle, a traffic sign, and a pedestrian included in the acquired image viewed by the driver.

3. The display device for the vehicle according to claim wherein the processor is configured to:
    control the display unit to display the navigation image using a carpet image in the first display area, and
    control the display unit to display the navigation image using an arrow image in the second display area.

4. The display device for the vehicle according to claim 1, wherein the processor is configured to:
    decrease a size of the first graphic image or an amount of information provided by the first graphic image when traffic volume increases in the acquired image viewed by the driver, and
    increase the size of the first graphic image or the amount of information provided by the first graphic image when traffic volume decreases in the acquired image viewed by the driver.

5. The display device for the vehicle according to claim 1, wherein the processor is configured to:
    control the display unit to display the first graphic image including the navigation image and surrounding traffic information when a speed of the vehicle is lower than a predetermined speed, and
    control the display unit to display only the navigation image when the speed of the vehicle is equal to or higher than the predetermined speed.

6. The display device for the vehicle according to claim 1, wherein the processor is configured to control the display unit to display a second graphic image indicating a position of a collision risk object on the windshield in response to the collision risk object being detected from a blind spot.

7. The display device for the vehicle according to claim 6, wherein the processor is configured to control the display unit to display a third graphic image representing a risk of collision on edges of the windshield in response to the collision risk object being detected.

8. The display device for the vehicle according to claim 1, wherein the processor is configured to control the display unit to display an overlap graphic image to overlap an area in which the detected at least one object is viewed.

9. The display device for the vehicle according to claim 8, wherein the overlap graphic image is a second graphic image and is displayed to overlap a lane on a departure prediction point.

10. The display device for the vehicle according to claim 8, wherein the overlap graphic image is a second graphic image and is an image for warning of a collision risk object included in the acquired image viewed by the driver and displayed to overlap the collision risk object.

11. The display device for the vehicle according to claim 10, wherein the processor is configured to:
    detect a gaze of the driver, and
    control the display unit to display the second graphic image indicating the collision risk object on the windshield corresponding to the detected gaze direction of the driver when the gaze direction mismatches a direction of the collision risk object.

12. The display device for the vehicle according to claim 1, wherein the processor is configured to:
control the display unit to display, by a second graphic image, a carpet image showing a route of the vehicle, in a windshield area in which a driving road is viewed, and
control the display unit to display, by a third graphic image, an arrow image showing the route of the vehicle, when the carpet image is hidden by the at least one object.

13. The display device for the vehicle according to claim 1, wherein the processor is configured to control the display unit to display a third graphic image highlighting a collision risk object and display remaining graphic images excluding the third graphic image to be relatively lower than the third graphic image in level of identification, when the collision risk object is detected from objects included in the acquired image viewed by the driver.

14. A method of controlling a display device for a vehicle, the method comprising:
acquiring, via a camera, an image around the vehicle;
displaying, via a display unit, a graphic image on a windshield of the vehicle;
detecting, via a processor, at least one object included in the acquired image viewed by a driver of the vehicle;
determining, via the processor, information of the detected at least one object comprising a position and size of an area of the windshield in which the at least one object is viewed, and a type of the at least one object; and
displaying, via the display unit, the graphic image on the windshield based on the determined information of the at least one object,
wherein the displaying the graphic image on the windshield includes:
setting, via the processor, an area of the windshield excluding the area of the windshield in which the detected at least one object is viewed as a display area;
determining, via the processor, an amount of information provided by the graphic image corresponding to a size of the display area;
determining, via the processor, a type of information provided by the graphic image corresponding to the determined amount of information provided by the graphic image in order of high importance;
displaying, via the display unit, the graphic image on the display area;
detecting, via the processor, the size of the display area is changed by the detected at least one object; and
changing, via the processor, the amount of information provided by the graphic image corresponding to the changed size of the display area and displaying a changed graphic image on the display area,
wherein a navigation image illustrating a route of the vehicle has the highest importance from among the information provided by the graphic image, and
wherein the displaying the graphic image on the windshield further includes:
setting, as a first display area, a first projected area in which a driving road on which the vehicle drives is viewed;
setting, as a second display area, a second projected area in which an upper area of the driving road is viewed;
displaying, via the display unit, the navigation image in the first display area when a size of the first display area is equal to or larger than a predetermined size; and
displaying, via the display unit, the navigation image in the second display area when the size of the first display area is smaller than the predetermined size.

15. The method according to claim 14, wherein when the detected at least one object includes a front vehicle, the displaying the graphic image on the windshield includes:
setting, via the processor, the display area of the graphic image based on a distance to the front vehicle; and
displaying, via the display unit, the graphic image on the display area, and
wherein the setting the display area includes:
setting, via the processor, an area above the front vehicle as the display area if the distance to the front vehicle is shorter than a predetermined distance; and
setting, via the processor, an area below the front vehicle as the display area if the distance to the front vehicle is equal to or longer than the predetermined distance.

16. A display device for a vehicle, the display device comprising:
a camera configured to acquire an image around the vehicle;
a display unit configured to display a graphic image on a windshield of the vehicle; and
a processor configured to:
detect at least one object included in the acquired image viewed by a driver of the vehicle,
determine information of the detected at least one object comprising a position and size of an area of the windshield in which the at least one object is viewed, and a type of the at least one object, and
control the display unit to display the graphic image on the windshield based on the determined information of the at least one object,
wherein when the detected at least one object is a front vehicle, the processor is configured to set a display area of the graphic image based on a distance to the front vehicle, and control the display unit to display the graphic image on the display area,
wherein the processor is further configured to:
set an area of the windshield excluding the area of the windshield in which the detected at least one object is viewed as a display area,
determine an amount of information provided by the graphic image corresponding to a size of the display area,
determine a type of information provided by the graphic image corresponding to the determined amount of information provided by the graphic image in order of high importance,
control the display unit to display the graphic image on the display area,
move the display area of the graphic image from an area below the front vehicle to an area above the front vehicle if the distance to the front vehicle is reduced within a predetermined distance, and
move the display area of the graphic image from the area above the front vehicle to the area below the front vehicle if the distance to the front vehicle is increased above the predetermined distance,
wherein a navigation image illustrating a route of the vehicle has the highest importance from among the information provided by the first graphic image, and wherein the processor is further configured to:
set, as a first display area, a first projected area in which a driving road on which the vehicle drives is viewed,
set, as a second display area, a second projected area in which an upper area of the driving road is viewed,
control the display unit to display the navigation image in the first display area when a size of the first display area is equal to or larger than a predetermined size, and
control the display unit to display the navigation image in the second display area when the size of the first display area is smaller than the predetermined size.

17. The display device for the vehicle according to claim 1, wherein the processor is further configured to:
detect a clean area of a detected front vehicle from an area of the windshield corresponding to the detected front vehicle,
set the detected clean area of the detected front vehicle as the display area, and
control the display unit to display the first graphic image on the display area corresponding to the detected clean area.

18. The display device for the vehicle according to claim 17, wherein the processor is further configured to control the display unit to display the navigation image with predetermined transparency on the display area corresponding to the detected clean area.

* * * * *